US008719309B2

(12) United States Patent  
Singer

(10) Patent No.: US 8,719,309 B2  
(45) Date of Patent: May 6, 2014

(54) METHOD AND APPARATUS FOR MEDIA DATA TRANSMISSION

(75) Inventor: David William Singer, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 514 days.

(21) Appl. No.: 12/757,011

(22) Filed: Apr. 8, 2010

(65) Prior Publication Data

US 2010/0262628 A1 Oct. 14, 2010

Related U.S. Application Data

(60) Provisional application No. 61/169,291, filed on Apr. 14, 2009.

(51) Int. Cl.
*G06F 7/00* (2006.01)
*G06F 17/30* (2006.01)

(52) U.S. Cl.
USPC ........................................................ 707/802

(58) Field of Classification Search
None
See application file for complete search history.

(56) References Cited

U.S. PATENT DOCUMENTS

| 6,487,663 | B1 | 11/2002 | Jaisimha et al. | |
|---|---|---|---|---|
| 2010/0111183 | A1* | 5/2010 | Jeon et al. | 375/240.16 |
| 2010/0153395 | A1* | 6/2010 | Hannuksela et al. | 707/737 |

FOREIGN PATENT DOCUMENTS

| KR | 2007 0111880 A | 11/2007 |
|---|---|---|
| KR | 2008 0007086 A | 1/2008 |
| KR | 2008 0081407 A | 9/2008 |
| WO | WO 2008/085013 A1 | 7/2008 |

OTHER PUBLICATIONS

"Secure Scalable Streaming Enabling Transcoding Without Decryption". 2001. IEEE International Conference on Image Processing, Thessaloniki, Greece; Wee hereinafter.*
PCT International Search Report and Written Opinion for PCT/US2010/030631 mailed Jul. 2, 2010.
Korean Patent Abstracts, Publication No. 1020080007086A, dated Jan. 17, 2008.
Cagdas Bilen et al., "A Multi-View Video Codec Based on H.264", Image Processing, 2006 IEEE International Conference on, IEEE, PI, Oct. 1, 2006, pp. 541-544, XP031048693, ISBN: 978-1-4244-0480-3.
Aksay et al.: "End-to-end stereoscopic video streaming with content-adaptive rate and format control" Signal Processing, Image Communication, Elsevier Science Publishers, Amsterdam, NL, LNKD-DOI:10.1016/J. Image. 2006.12.001, vol. 22, No. 2, Mar. 16, 2007, pp. 157-168, XP005938665, ISSN: 0923-5965.
PCT International Preliminary Report on Patentability mailed Oct. 27, 2011 for PCT/US2010/030631 filed Apr. 9, 2010, 5 pages.

* cited by examiner

*Primary Examiner* — Rehana Perveen
*Assistant Examiner* — Raheem Hoffler
(74) *Attorney, Agent, or Firm* — Blakely, Sokoloff, Taylor & Zafman LLP

(57) ABSTRACT

The present invention provides methods and apparatuses for processing readable content stored in a stream of data which contains samples for presenting a presentation at a plurality of views. In one embodiment, the first stream is stored and a second stream is derived from a first stream, where the second stream contains references to the first stream for use in selecting data, for an operating point within the content that includes the plurality of views, from the first stream. According to one aspect of the invention, references contained in stored second stream are accessed to transmit or store the data from the first stream.

20 Claims, 27 Drawing Sheets

METHOD AND APPARATUS FOR MEDIA DATA TRANSMISSION

RELATED APPLICATIONS

Applicant claims the benefit of priority of prior, co-pending provisional application Ser. No. 61/169,291, filed Apr. 14, 2009.

FIELD OF THE INVENTION

The present invention relates to methods and apparatuses for preparing time related sequences of media data for transmission, and more particularly to packetized transmission of such media data.

INTRODUCTION AND BACKGROUND

There are various different file structures used today to store time-based media: audio formats such as AIFF, video formats such as AVI, and streaming formats such as RealMedia. One reason that such file structures are different is their different focus and applicability. Some of these formats are sufficiently relatively widely accepted, broad in their application, and somewhat simple to implement, and thus, may be used not only for content delivery but also as interchange formats. Foremost among these general formats is the QuickTime file format. It is used today in the majority of web sites serving time-based data; in the majority of authoring environments, including professional ones; and on the majority of multimedia CDROM titles.

The QuickTime media layer supports the efficient display and management of general multimedia data, with an emphasis on time-based material (video, audio, etc.). The media layer uses the QuickTime file format as the storage and interchange format for media information. The architectural capabilities of the layer are generally broader than the existing implementations, and the file format is capable of representing more information than is currently demanded by the existing QuickTime implementations.

In contrast to formats such as AVI, which were generally designed to support local random access of synchronized media, QuickTime allows systems to manage the data, relationships and timing of a general multimedia presentation. In particular, the QuickTime file format has structures to represent the temporal behavior of general time-based streams, a concept which covers the time-based emission of network packets, as well as the time-based local presentation of multimedia data.

The existing QuickTime file format is publicly described by Apple Computer in the May 1996 File format specification, which may be found at the QuickTime site, <http://.www.apple.com/quicktime>.

One aspect of the QuickTime file format is the concept that the physical structure of media data (the layout in disk records) is independent of, and described by, a logical structure for the file. The file is fully described by a set of "movie" meta-data. This meta-data provides declarative, structural and temporal information about the actual media data.

The media data may be in the same file as the description data, (the "movie" meta-data), or in other file(s). A movie structured into one file is commonly called "flat", and is self-contained. Non-flat movies can be structured to reference some, or all, of the media data in other files.

As such, the format is generally suited for optimization in different applications. For example, when editing (compositing), data need not be rewritten as edits are applied and media is re-ordered; the meta-data file may be extended and temporal mapping information adjusted. When edits are complete, the relevant media data and meta-data may be rewritten into a single, interleaved, and optimized file for local or network access. Both the structured and the optimized files are valid QuickTime files, and both may be inspected, played, and reworked.

The use of structured ("non-flat") files enables the same basic media data to be used and re-used in any number of presentations. This same advantage applies when serving, as will be seen below.

In both editing and serving, this also permits a number of other files to be treated as part of a movie without copying the media data. Thus editing and serving may be done directly from files such as Sun Microsystem's "au" audio format or the AVI video format, greatly extending the utility of these formats.

The QuickTime file is divided into a set of objects, called atoms. Each object starts with an atom header, which declares its size and type:

```
class Atom {
    int(32)     size;
    char        type[4];
    byte        contents[ ];
}
```

The size is in bytes, including the size and type header fields. The type field is four characters (usually printable), to permit easy documentation and identification. The data in an object after the type field may be fields, a sequence of contained objects, or both.

A file therefore is simply a sequence of objects:

```
class File {
    Atom[ ];
}
```

The two important top-level objects are the media-data (mdat) and the meta-data (moov).

The media-data object(s) contain the actual media (for example, sequences of sound samples). Their format is not constrained by the file format; they are not usually objects. Their format is described in the meta-data, not by any declarations physically contiguous with them. So, for example, in a movie consisting solely of motion-JPEG, JPEG frames are stored contiguously in the media data with no intervening extra headers. The media data within the media data objects is logically divided into chunks; however, there are no explicit chunk markers within the media data.

When the QuickTime file references media data in other files, it is not required that these 'secondary' files be formatted according to the QuickTime specification, since such media data files may be formatted as if they were the contents of a media object. Since the QuickTime format does not necessarily require any headers or other information physically contiguous with the media data, it is possible for the media data to be files which contain 'foreign' headers (e.g. UNIX ".au" files, or AVI files) and for the QuickTime meta-data to contain the appropriate declarative information and reference the media data in the 'foreign' file. In this way the QuickTime file format can be used to update, without copying, existing bodies of material in disparate formats. The QuickTime file format is both an established format and is able to work with, include, and thereby bring forward, other established formats.

Free space (e.g. deleted by an editing operation) can also be described by an object. Software reading a file that includes free space objects should ignore such free space objects, as well as objects at any level which it does not understand. This permits extension of the file at virtually any level by introducing new objects.

The primary meta-data is the movie object. A QuickTime file has exactly one movie object which is typically at the beginning or end of the file, to permit its easy location:

```
class   Movie {
        int(32)         size;
        char            type[4] = 'moov';
        MovieHeader     mh;
        contents        Atom[ ];
}
```

The movie header provides basic information about the overall presentation (its creation date, overall timescale, and so on). In the sequence of contained objects there is typically at least one track, which describes temporally presented data.

```
class   Track {
        int(32)         size;
        char            type[4] = 'trak';
        TrackHeader     th;
        contents        Atom[ ];
}
```

The track header provides relatively basic information about the track (its ID, timescale, and so on). Objects contained in the track might be references to other tracks (e.g. for complex compositing), or edit lists. In this sequence of contained objects there may be a media object, which describes the media which is presented when the track is played.

The media object contains declarations relating to the presentation required by the track (e.g. that it is sampled audio, or MIDI, or orientation information for a 3Dscene). The type of track is declared by its handler:

```
class   handler {
        int(32)         size;
        char            type[4] = 'hdlr';
        int(8)          version;
        bit(24)         flags;
        char            handlertype[4];       -- mhlr for media handlers
        char            handlersubtype[4]     -- vide for video, soun for
audio
        char            manufacturer[4];
        bit(32)         handlerflags;
        bit(32)         handlerflagsmask;
        string          componentname;
}
```

Within the media information there is likewise a handler declaration for the data handler (which fetches media data), and a data information declaration, which defines which files contain the media data for the associated track. By using this declaration, movies may be built which span several files.

At the lowest level, a sample table is used which relates the temporal aspect of the track to the data stored in the file:

```
class   sampletable {
        int(32)             size;
        char                type[4] = 'stbl';
        sampledescription   sd;
        timetosample        tts;
        syncsampletable     syncs;
        sampletochunk       stoc;
        samplesize          ssize;
        chunkoffset         coffset;
        shadowsync          ssync;
}
```

The sample description contains information about the media (e.g. the compression formats used in video). The time-to-sample table relates time in the track, to the sample (by index) which should be displayed at that time. The sync sample table declares which of these are sync (key) samples, not dependent on other samples.

The sample-to-chunk object declares how to find the media data for a given sample, and its description given its index:

```
class   sampletochunk {
        int(32)         size;
        char            type[4] = 'stsc';
        int(8)          version;
        bits(24)        flags;
        int(32)         entrycount;
        for (int i=0; i<entrycount; i++) {
                int(32)     firstchunk;
                int(32)     samplesperchunk;
                int(32)     sampledescriptionindex;
        }
}
```

The sample size table indicates the size of each sample. The chunkoffset table indicates the offset into the containing file of the start of each chunk.

Walking the above-described structure to find the appropriate data to display for a given time is fairly straightforward, generally involving indexing and adding. Using the sync table, it is also possible to back-up to the preceding sync sample, and roll forward 'silently' accumulating deltas to a desired starting point.

FIG. 1 shows the structure of a simple movie with one track. A similar diagram may be found in the QuickTime file format documentation, along with a detailed description of the fields of the various objects. QuickTime atoms (objects) are shown here with their type in a grey box, and a descriptive name above. This movie contains a single video track. The frames of video are in the same file, in a single chunk of data. It should be noted that the 'chunk' is a logical construct only; it is not an object. Inside the chunk are frames of video, typically stored in their native form. There are no required headers or fields in the video frames themselves.

FIG. 2 is a diagram of a self-contained file with both an audio and a video track. Fewer of the atoms are shown here, for brevity; the pointers from the tracks into the media data are, of course, the usual sample table declarations, which include timing information.

The QuickTime file format has a number of advantages, including:
1) Scalability for size and bit-rates. The meta data is flexible, yet compact. This makes it suitable for small downloaded movies (e.g. on the Internet) as well as providing the basis for a number of high-end editing systems.
2) Physical structure is independent of the logical and temporal structure. This makes it possible to optimize the physical structure differently depending on the use the file will have. In particular, it means that a single file format is suitable for authoring and editing; downloading or placing on CDROMs; and for streaming.

3) The file format has proven capable of handling a very broad variety of codec types and track types, including many not known at the time the format was designed. This proven ability to evolve in an upwards-compatible fashion is fundamental to the success of a storage format.

Scalable, or layered, codecs can be handled in a number of ways in the QuickTime file format. For a streaming protocol which supports scalability, the samples may be tagged with the layer or bandwidth threshold to be met for transmitting the samples.

Tracks which form a set of alternatives (e.g. different natural language sound tracks) can be tagged so that only one is selected for playback. The same structure can be used to select alternatives for streaming (e.g. for language selection). This capability is described in further detail in the QuickTime file format.

When QuickTime displays a movie or track, the appropriate media handler accesses the media data for a particular time. The media handler must correctly interpret the data stream to retrieve the requested data. For example, with respect to video media, the media handler typically traverses several atoms to find the location and size of a sample for a given media time. The media handler may perform the following:

1. Determine the time in the media time coordinate system.
2. Examine the time-to-sample atom to determine the sample number that contains the data for the specified time.
3. Scan the sample-to-chunk atom to discover which chunk contains the sample in question.
4. Extract the offset to the chunk from the chunk offset atom.
5. Find the offset within the chunk and the sample's size by using the sample size atom.

It is often desirable to transmit a QuickTime file or other types of time related sequences of media data over a data communication medium, which may be associated with a computer network (e.g. the Internet). In many computer networks, the data which is transmitted into the network should generally be in a packet form. Normally, time related sequences of media data are not in the proper packetized format for transmission over a network. For example, media data files in the QuickTime format are not in a packetized format. Thus, there exists a need to collect the data, sometimes referred to as streaming data, into packets for transmission over a network.

One prior approach to address the problem of transmitting time related sequences of media data over a network is to send the media file over the network using a network or transmission protocol, such as the Hypertext Transfer Protocol (HTTP). Thus, the media file itself is sent from one computer system over the network to another computer system. However, there may be no desire to retain the media file at the receiving computing system. That is, when the media file is received and viewed or listened to at the receiving computer system, there may be no desire by the user of that receiving computer system to store a copy of the file, for example, if the receiving computing system is a network computer or a computer with low storage capacity.

Another alternative approach to solving the problem of how to collect data for transmission by packets over a network is to prepare a file which contains the network protocol data units in the file for a particular transmission protocol. In a sense, such a file may be considered a packetized file which is stored in essentially the same format as it will be transmitted according to the particular transmission protocol. Performing this operation generally involves storing the file in a packetized form for a particular network protocol at a particular data transmission rate and a particular media file format. Thus, for each different transmission protocol at a particular data transmission rate, the file will essentially be replicated in its packetized form. The fixed form of such files may restrict their applicability/compatibility and make it difficult to view such files locally. Thus, such an approach may greatly increase storage requirements in attempting to provide the file in various transmission protocols at various different data transmission rates. Moreover, each packetized file generated according to this alternative prior approach is generally limited to a particular media file format, and thus, other media file formats for the same media object (e.g. a digital movie) are typically packetized and stored on the sending computer system.

Yet another approach to solving the problem of how to stream time related sequences of media data is to perform the packetization of the media data when required on the transmitting system according to the particular transmission protocol which is desired. This processing requires, in many cases, a relatively considerable amount of time, and thus, may slow the performance of the transmitting system.

Thus, it is desirable to provide an improved method and apparatus for transmitting time related sequences of media data.

SUMMARY OF THE INVENTION

The present invention provides methods and apparatuses for processing readable content stored in a stream of data which contains samples for presenting a presentation that can be viewed from any one of a plurality of views. In one embodiment, the first stream is stored and a second stream is derived from a first stream, where the second stream contains references to the first stream for use in selecting data, for an operating point within the content that includes the plurality of views, from the first stream. According to one aspect of the invention, references contained in stored second stream are accessed to transmit or store the data from the first stream.

DETAILED DESCRIPTION

The present invention provides methods and apparatuses for allowing the transmission, and particularly the packetized transmission of time related sequences of media data, which may include, for example, video, audio, video and audio, etc., over a communication media, such as in a computer network.

In one embodiment of the present invention, a digital processing system creates a set of data for indicating how to transmit a time related sequence of media data according to a transmission protocol. Typically, this set of data is stored on a storage device coupled to the digital processing system. Further, this set of data is a time related sequence of data associated with the time related sequence of media data.

The present invention may be implemented entirely in executable computer program instructions which are stored on a computer readable media or may be implemented in a combination of software and hardware, or in certain embodiments, entirely in hardware. Typically, a server computer system coupled to a network will create the set of data, which may be referred to as a hint track and will store this hint track in a storage device which is coupled to the server computer system. When a client computer system requests a presentation (e.g. a viewing or listening or viewing and listening) of a media data file, the server system uses the hint track to determine how to packetize the media data for transmission to the client computer system. It will be appreciated that the present invention is generally applicable to time related sequences of media data, and that QuickTime is represented herein as one example of this general applicability. Thus, the invention should not necessarily be limited to QuickTime.

Figure 1:
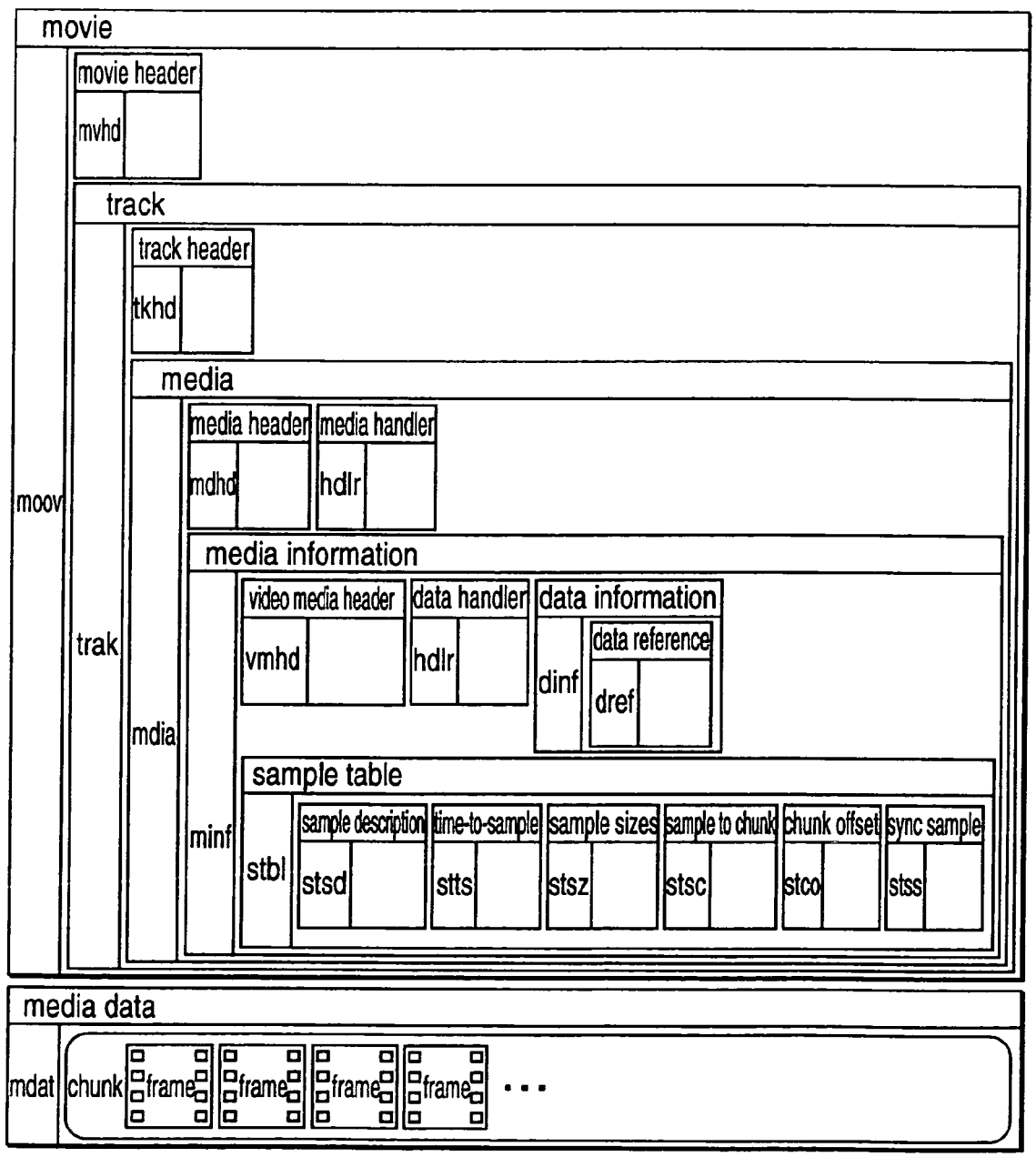
FIG. 1 shows an example of the structure of a simple movie with one track in the prior art.
Figure 2:
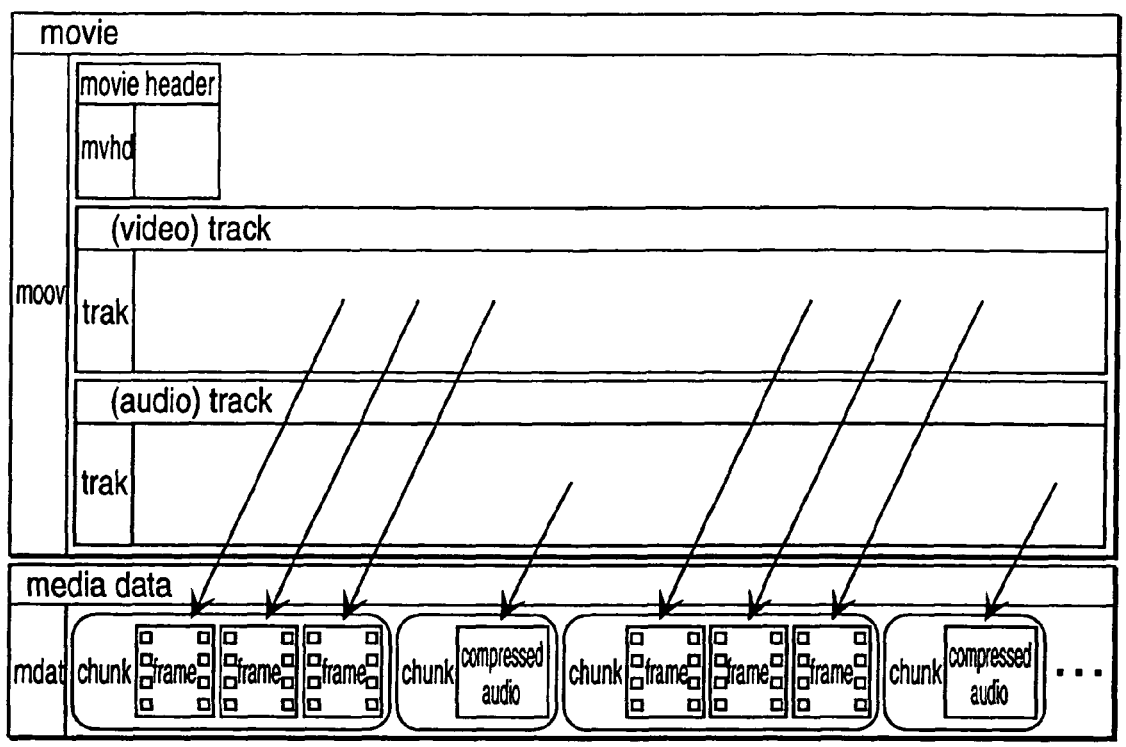
FIG. 2 is an example of a self-contained movie file of the prior art.
Figure 3:
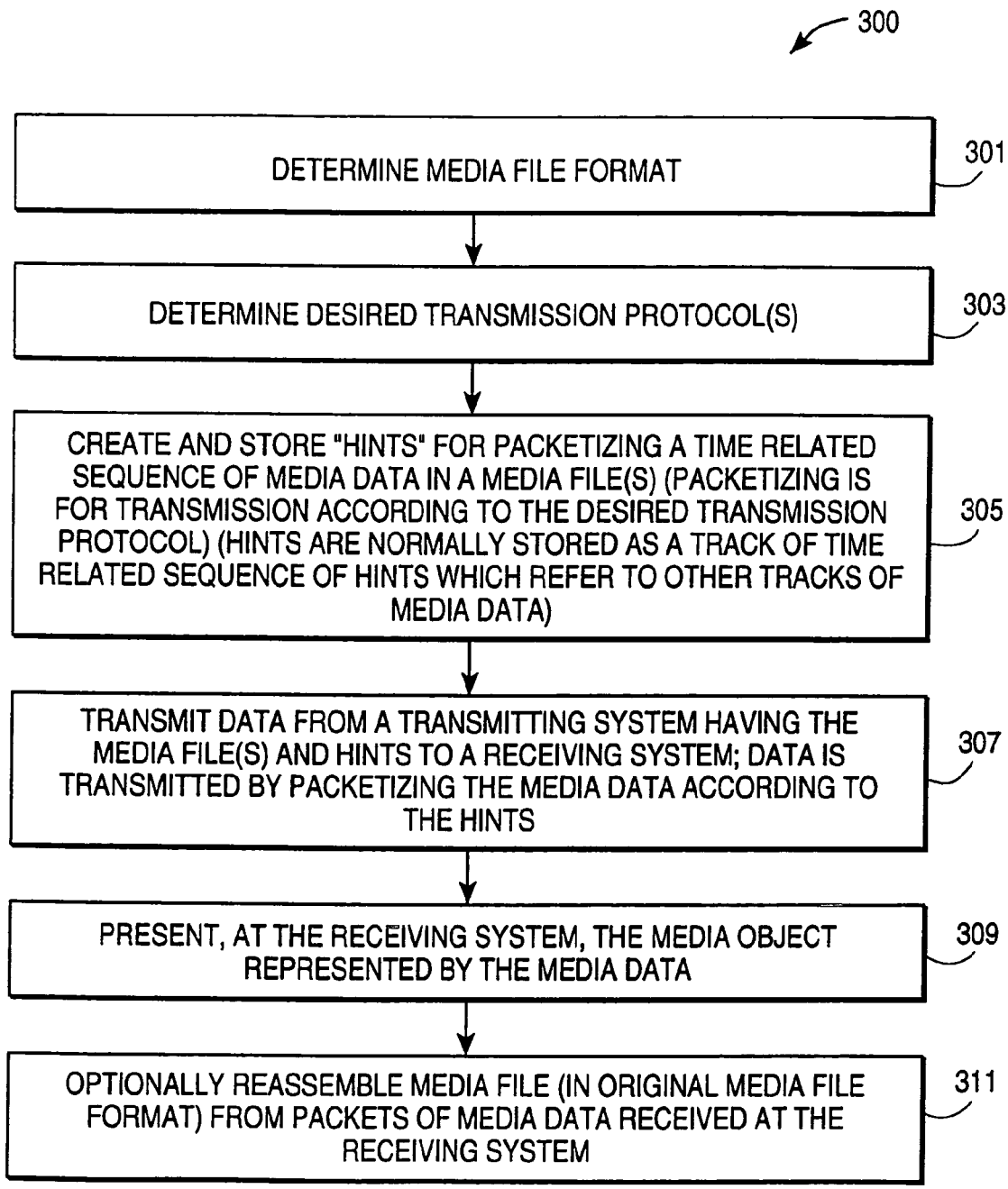
FIG. 3 is a flowchart showing one example of a method according to the present invention.

FIG. 3 shows one example of a method according to the present invention. The method 300 shown in FIG. 3 begins in step 301, in which the media file format for the particular media data which is desired to be transmitted is determined. In step 303, the particular transmission protocol or protocols which are desired to be used is also determined. However, steps 301 and 303 are optional, for example, in the case where the same media file format is always transmitted using the same transmission protocol.

In step 305, a digital processing system, such as a server computer system, creates and stores the hints for packetizing a time related sequence of media data in a media file. Alternatively, one computer system may create the hints and provide them to another system, such as a server computer system, which stores them for later use in a transmission process. The packetization allows the transmission over a network or communication media according to the desired transmission protocol which was determined in step 303. In one embodiment of the present invention, the hints are stored as a track of time related sequence of hints which refers to, but which in one embodiment, is separate from other tracks of media data. The track of hints, in one embodiment of the present invention, may be stored separately from the media data to which it refers. As such, the track of hints may be stored in a file which is distinct from another file containing the media data which is referred to by the track of hints, or the track of hints may be stored in a hint area in the file containing the media data which is separate and distinct from the data area containing the actual media data. In one embodiment of the invention, a hint track, or portion thereof, may be interpreted as executable instructions by the server, which executable instructions cause the server to packetize a time related sequence of data, which is typically, but not necessarily, time-based media data. In one embodiment of the present invention, the hints are stored on the storage device which is coupled to the transmitting digital processing system.

In step 307, the data which is packetized according to the hints, is transmitted from a transmitting system, such as a server computer system, to a receiving system. This media data is transmitted by packetizing the media data according to the hints. In one alternative embodiment of the invention, the server computer system may decide not to use the hints and to send the media data by an alternative packetization process.

In step 309, the receiving system presents the media object which is represented by the media data. Typically, this presentation (which may be a viewing and listening of a media object or merely a viewing or merely a listening of the media object) is performed as the packetized data is received at the receiving system. The packetized data may, in one embodiment of the present invention, but need not be, stored on the receiving system. Thus the presentation of the data is ephemeral in the sense that once the presentation is over, there is no local copy at the receiving system. In another embodiment, presentation of the media object may take place on the server system subsequent to creating hints for the media data representing the media object. In one embodiment of the invention, the media data is not necessarily (re)formatted, copied, etc., for packetization according to hints.

In step 311, the receiving system may optionally reassemble the media file if the media file as received has been stored on the receiving system. It will be appreciated that the various steps of the method shown in FIG. 3 may be performed in a different order than the one shown and described above and/or some of the steps may be performed simultaneously. For example, in one embodiment, steps 309 and 311 are performed in parallel.

A particular implementation with QuickTime according to one embodiment of the present invention will now be described. In one embodiment of the present invention, a presentation which can be both viewed locally to the file (e.g., at a server, generator, etc.), and streamed over a network within a QuickTime movie is provided. In general, the streaming server (or another system) should have information about the data units to stream, their composition and timing. Since such information is typically temporal it may be described in tracks. A server may perform packetization and determine protocol information, for example, by using the same indexing operations as would be used to view a presentation.

The tracks which contain instructions for the servers are sometimes referred to as 'hint' tracks, since such tracks represent a set of data to direct the server in the process of forming and transmitting packets. The QuickTime file format supports streaming of media data over a network as well as local playback. The process of sending protocol data units is time-based, just like the display of time-based data, and is therefore suitably described by a time-based format. A QuickTime file or 'movie' which supports streaming includes information about the data units to stream. This information is included in additional tracks of the file called "hint" tracks.

Hint tracks contain instructions for a streaming server (or other digital processing system) which assist in the formation of packets. These instructions may contain immediate data for the server to send (e.g. header information) or reference segments of the media data. In one embodiment of the present invention, instructions are encoded in the QuickTime file in the same way that editing or presentation information is encoded in a QuickTime file for local playback. Instead of editing or presentation information, information may be provided which may allow a server to packetize the media data in a manner suitable for streaming using a specific network transport.

In one embodiment of the present invention, the same media data is used in a QuickTime file which contains hints, whether it is for local playback, or streaming over a number of different transport types. Separate 'hint' tracks for different transport types may be included within the same file and the media may play over all such transport types without making any additional copies of the media itself. In addition, existing media may be made streamable by the addition of appropriate hint tracks for specific transports. According to one aspect of the invention, media data itself need not be recast or reformatted.

Therefore the samples in a hint track generally contain instructions to form packets. These instructions may contain immediate data for the server to send (e.g. header information) or reference segments of the media data in another track.

In one embodiment of the present invention, a three-level design is utilized such that:

1) The media data is represented as a set of network-independent tracks, which may be played, edited, and so on, as normal;
2) There is a common declaration and base structure for server hint tracks; this common format is protocol independent, but contains the declarations of which protocol(s) are described in the server track(s);
3) There is a specific design of the server hint tracks for each protocol which may be transmitted; all these designs use the same basic structure. For example, there may be designs for RTP (for the Internet) and MPEG-2 transport (for broadcast), or for new standard or vendor-specific protocols.

In one embodiment of the present invention, the resulting streams, sent by the servers under the direction of the hint tracks, are normal streams, and do not necessarily include a trace of QuickTime information. This embodiment of the invention does not require that QuickTime, or its structures or declaration style, necessarily be either in the data on the transmission medium (e.g. network cable) or in the decoding station. For example, a file using H.261 video and DVI audio, streamed under RTP, may result, in one embodiment of the present invention, in a packet stream which is fully compliant with the IETF specifications for packing those codings into RTP.

In one embodiment of the invention, hint tracks are built and flagged so that when the presentation is viewed locally, the hint tracks are essentially ignored by a receiving system.

In one embodiment, a time related sequence of media data, which may, for example, include video, audio, etc., may be packetized by a digital processing system, and then presented on the same digital processing system. Furthermore, packetization may be ephemeral, such that the time related sequence being presented, stored, read, etc., is also packetized "on the fly." In one embodiment, hints may refer to media data that has not been copied, formatted, etc.; for example, the media data to which hints refer may be stored in original format on a read-only memory, etc.

In one embodiment, the same hinting routine that provides packetization also presents the media as packetization is performed. In alternative embodiments of the invention, a packetized file of time related media data may be generated according to hint tracks and stored, for example, for later transmission.

Figure 4:
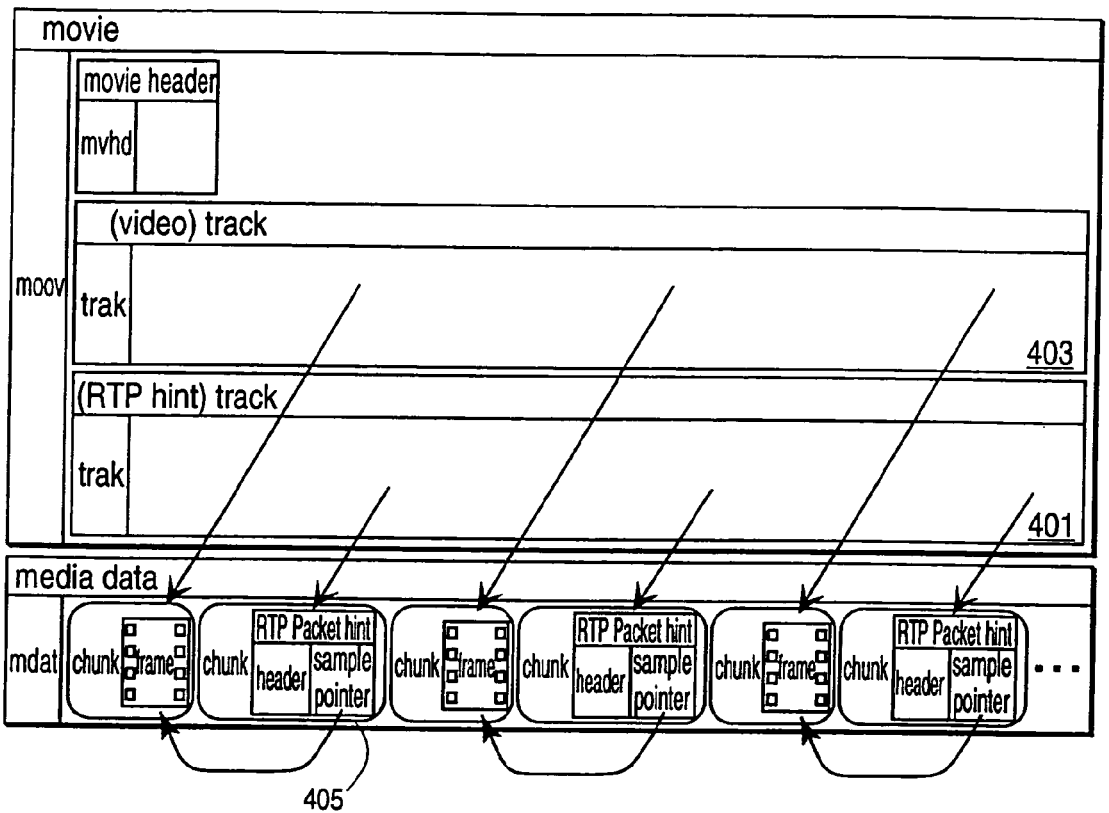
FIG. 4 shows an example of a hint track of the present invention.

FIG. 4 illustrates utilization of hint tracks for transporting media data, according to one embodiment of the invention. In FIG. 4, a hint track 401 is shown for the media track 403. Each hint track sample, such as hint track sample 405—which describes how to form an RTP packet—may contain a header, and may reference some data from an associated media track—in this case, a video track 403. In the embodiment shown in FIG. 4, the media data (the video frames) and the RTP hints have been interleaved so that the associated media file may be read relatively easily. In this example, each frame is shown as fitting into a single RTP packet. Of course, it is possible to split frames into several packets when needed. Conversely, multiple frames can, if desired, be placed in a single packet, which is commonly performed with audio data.

As discussed above, the logical structure described above need not imply physical structure. The meta data may be cached in memory, and the hint track samples physically interleaved with the media samples to which they refer (as is shown in FIG. 4).

Figure 5:
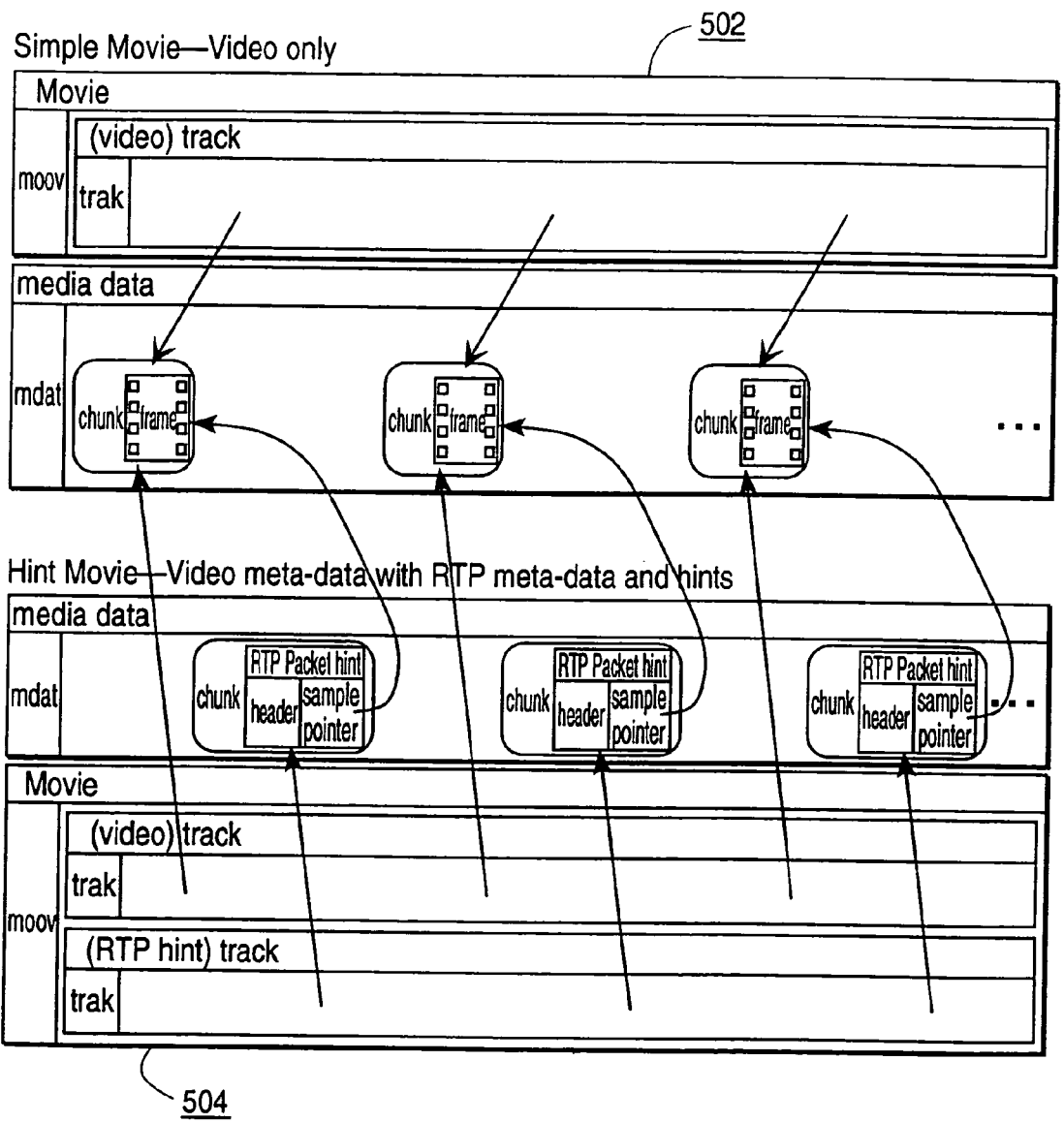
FIG. 5 shows another example of a hint track of the present invention.

Alternatively, it is possible to write a new set of meta data and media data, containing the hint tracks, which references and augments the meta data and media data in an existing presentation. FIG. 5 illustrates utilization of hint tracks to reference media data in a separate file, according to one embodiment of the invention. In FIG. 5, two movie files 502 and 504 are shown, each with their own meta-data. The first, the movie file 502, includes a video track. The second, the movie file 504, contains both a video track and a hint track, but the meta-data declares that the media data for the video track is in the first movie 502. Thus the hints associated with the movie file 504 also point to the media data in the first movie 502.

In one embodiment of the present invention, a media file may contain packetization hint tracks for multiple protocols. As such, each track may contain declarations of the protocol (and protocol parameters, if appropriate) for which the hint track is appropriate. These tracks may all, of course, reference media data from the basic media tracks in the file. The desire for protocol independence and extensibility may be met in the described manner.

In one embodiment of the present invention, hint tracks need not use all the data in the media tracks. The hint tracks may use a subset of the data (e.g. by omitting some video frames) to reach a bandwidth threshold, or for other reasons. Since multiple hint tracks may be provided for the same protocol, differing subsets of the same basic media information at different rates may be provided. As such, the present invention may provide improved scalability over prior methods and apparatuses.

It should be emphasized that though the hint tracks themselves, and the QuickTime meta-data, should, in one embodiment, be in QuickTime files, the base media can be left in any file type which QuickTime can import and reference in place. In one embodiment of the present invention, the meta-data in the movie file may include a data reference which declares that the media data is in another file. The sample table offsets and pointers may thus refer to data in this 'foreign' file. Thus, according to one embodiment of the present invention, existing legacy formats such as "au" audio files, "AVI" audio/video files, and MIDI files, may be streamed without requiring the copying or reformatting of the base media data. Since the base media data is not written to, but merely augmented by QuickTime declarations and hint information in separate files, the base media data may also be provided on read-only machine readable media such as CDROM.

In one embodiment of the present invention, the hint tracks embody the results of off-line computation and are typically optimized to provide the server with information to support packetization, and if needed, multiplexing.

Example hints, for example, for RTP (the IETF standard real-time protocol) and MPEG-2 transport are shown in Appendixes A-C.

In one embodiment of the present invention, a single file may support hint tracks for multiple protocols, or multiple different parameterizations of the same protocols, without undue space overhead. New protocols, and their associated hint tracks, may be designed without disrupting systems relying on existing protocols. Thus the invention, at least in one embodiment, is protocol-neutral.

In the QuickTime file format, a track may be added to the movie by updating or copying and augmenting the meta-data. If the media data is in files separate from the meta-data, or optimized interleave is not required, this can be a relatively simple and efficient operation.

In one embodiment of the present invention, tracks may be extracted by building a new set of movie meta-data which contains only one track, and which can, if desired, reference the media data in the original.

For example, in one embodiment of the present invention, a new audio track may be added which is marked as being an alternative to a set of other audio tracks. If it is also marked with the language code (e.g. French, or Tagalog), then the appropriate track may be selected at presentation time.

SMPTE time-code tracks are an example of elementary streams which may be present, added, or removed, as need arises, according to one embodiment of the invention.

According to one aspect of the invention, hint tracks may permit the development of new formats for new protocols without causing compatibility issues for existing servers or local playback. In addition, new media tracks may be added over the life of the file format while maintaining backwards compatibility.

In one embodiment of the present invention, the areas of extensibility include:
  a) New track types which can be defined for media types not covered by the current QuickTime file format (e.g. laboratory instrument readings).
  b) New coding types for existing tracks which may be defined (e.g. video or audio codecs). There is explicit provision for their codec-specific initialization information.
  c) New hint track types which may be defined for new protocols, and a file which may contain hint information for more than one protocol without incurring a space overhead for the media data itself.

Existing content on read-only media may be used with the present invention (e.g., prepackaged movies on CD ROM, DVD, etc.).

Furthermore, according to one aspect of the invention, various "foreign" file formats may be used. In one embodiment of the present invention, for example, if the existing content is either in QuickTime format, or can be imported, it may be edited and streamed without requiring copying or re-formatting.

In one embodiment of the present invention, if a codec supports striping of the media data to achieve scalability of bandwidths, then these striped bandwidths may be represented using multiple stream tracks. Each track may represent a different bandwidth. Tracks may be grouped together in selected subsets of the basic media.

In one embodiment of the present invention, if a protocol supports bandwidth scalability, then the hint track itself may contain information for each protocol data unit (sample in the hint track). Information may include the bandwidth threshold above which the protocol data unit should be delivered to the network. Thus, hint tracks may indicate an available bandwidth as being high, low, etc., and/or other information relating to bandwidth for data transmission.

In one embodiment of the present invention, if the protocol is a multiplexing protocol (e.g. MPEG-2 transport) then different hint tracks may be built which use a different subset of the elementary stream tracks to achieve different data-rates. Hence, some tracks may be omitted entirely for low bit-rate transmission.

In one embodiment of the present invention, if it is desired to record the base data using different codecs, then those tracks may be formed into a group of alternatives, and only one selected for presentation. The selection of which track to use for presentation is typically protocol-dependent and may be achieved by using the hint track approaches described herein.

In one embodiment of the present invention, encryption may also be pre-applied to a media file. In this case, the encrypted data may be stored in either (a) a new elementary stream (a new track) which is linked to the original media data (or the original media data may be removed if it is no longer needed) or (b) the hint track itself. In case (b), it is possible that the hint track does not extract any data from the elementary un-encrypted stream on the fly. Thus, all of the media data may be in the hint track as well as the streaming packet protocol data unit information, because the media data may be transformed by encryption.

As an example of embedded object content information, the IETF session description information for a whole movie, and for individual tracks, may be stored in the meta-data for the RTP hint tracks, as user atoms.

In one embodiment of the present invention, a file format typically contains both media data in a playable format, and streaming information. In one embodiment, it is possible to stream directly from this format with relatively low overhead, while preserving the media independence, protocol independence, and ability to present the media locally.

According to one aspect of the invention, hint tracks may abstract detailed knowledge of codecs, timing and packetization, into an off-line preparation process. Thus, following the hint tracks to generate the data stream may be relatively simple and require no specialized knowledge of the media being streamed. Thus, decoupling of a server, for example, from the details of the data content may be provided, according to one aspect of the invention.

In one embodiment of the present invention, a set of hint tracks may be used to construct a file which is directly optimized for streaming—for example, by laying out network PDUs on disk at logical disk boundaries, in the time sequence in which they should sent. Such a file may no longer be a general presentation, but may be streamed. In one embodiment, packetized files created with hint tracks may be stored and, for example, later optimized for streaming.

In one embodiment of the present invention, by encapsulating foreign file formats, media data may be retained in other formats while still be published in QuickTime. For example, an existing format may be directly encapsulated into a new media data file by applying the proper wrapper, or may be left intact and referred to in segments or as a whole by the hint track, allowing the legacy formats to be streamed without copying. A single movie may contain pieces selected from multiple legacy formats. This invention does not constrain the base media format.

In general, a common format which spans capture, authoring and editing, download and streaming, will generally provide flexibility. Material may be reworked after use, or used in multiple ways, without being copied or re-formatted. In one embodiment of the present invention, it is possible to re-work and re-use material which has been hinted, by stripping the hint tracks, using standard editors, and then re-hinting after editing is completed.

If it is desired that a media file be downloaded for local viewing, an optimized interleaved file may be built for that purpose, with the streaming meta-data in a separate declaration file referencing the same base media data. The download may not, therefore, include the streaming information, and yet the media data may be present only once at a streaming server.

By separating logical structure from physical structure, the physical structure of the file may be optimized differently depending on the application (e.g. editing, local viewing, streaming).

By permitting the existence of multiple hint tracks for each media track, in one embodiment of the present invention, the file may be published by streaming over multiple protocols, without requiring multiple copies of the media.

Figure 6:
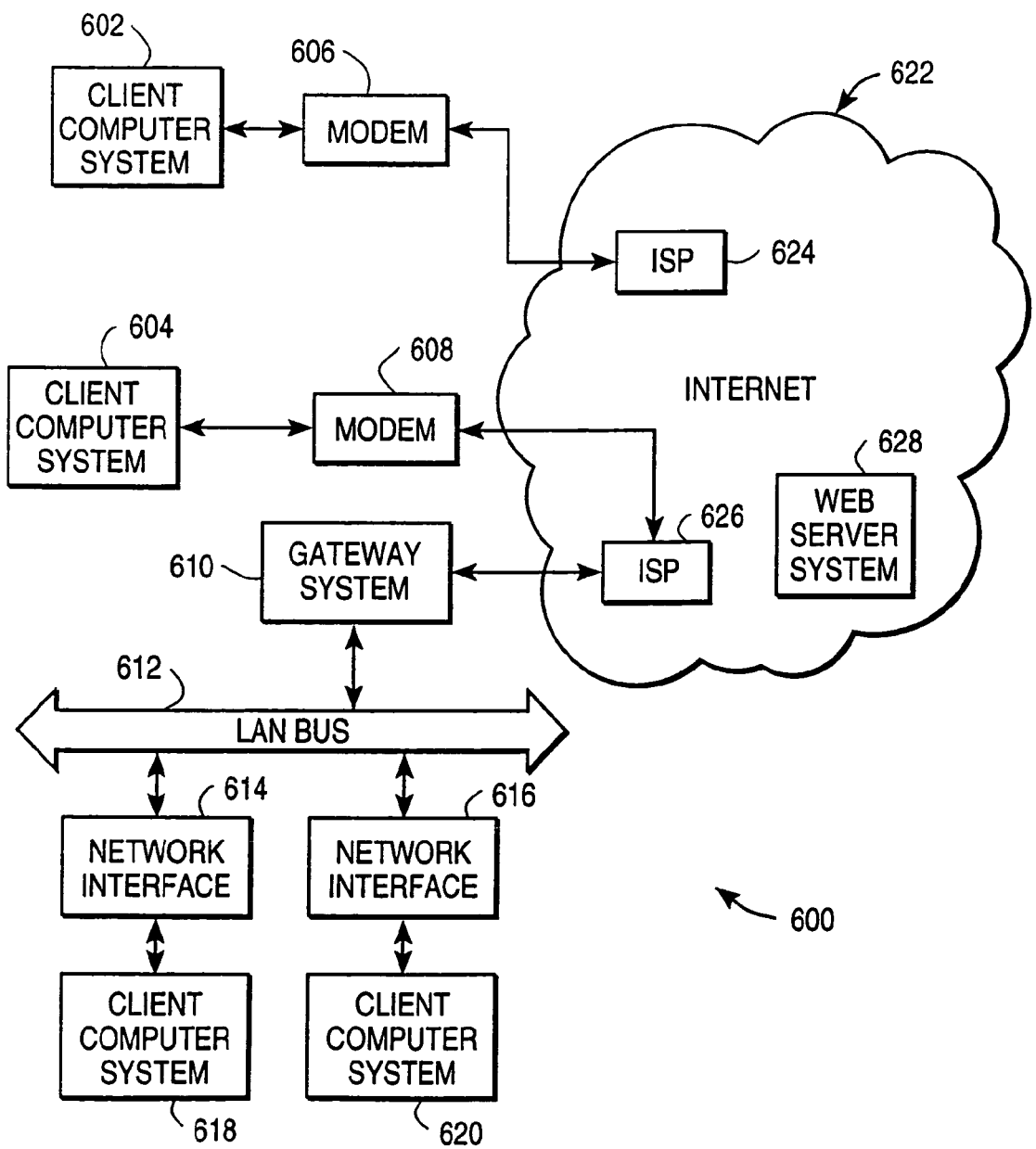
FIG. 6 is a diagram of a network of computer systems in which media data may be exchanged and/or processed, according to one embodiment of the present invention.

FIG. 6 is a diagram of a network of computer systems in which media data may be processed, according to one embodiment of the present invention. As shown in FIG. 6, a number of client computer systems, one or more of which may represent one implementation of the receiving system described above with reference to FIG. 3, are coupled together through an Internet 622. It will be appreciated that the term "Internet" refers to a network of networks. Such networks may use a variety of protocols for exchange of information, such as TCP/IP, ATM, SNA, SDI, etc. The physical connections of the Internet and the protocols and communication procedures of the Internet are well known to those in the art. Access to the Internet 103 is typically provided by Internet service providers (ISPs), such as the ISP 624 and the ISP 626. Users on client systems, such as the client computer systems 602, 604, 618, and 620, generally obtain access to the Internet through Internet service providers, such as ISPs 624 and 626. Access to the Internet may facilitate transfer of information (e.g., email, text files, media files, etc.) between two or more digital processing systems, such as the client computer systems 602, 604, 618, and 620 and/or a Web server system 628. For example, one or more of the client computer systems 602, 604, 618, and 620 and/or the Web server 628 may provide media data (e.g., video and audio, or video, or audio) to another one or more of the client computer systems 602, 604, 618, and 620 and/or the Web server 628. Such may be provided in response to a request. As described herein, such media data may be transferred in the system 600 according hints. Such hints, in one embodiment of the invention, may be created according to a specific format of the media data and/or a specific data communication (e.g., network) protocol(s).

The Web server 628 is typically comprised of at least one computer system to operate with one or more data communication protocols, such as the protocols of the World Wide Web, and as such, is typically coupled to the Internet 622. Optionally, the Web server 628 may be part of an ISP which may provide access to the Internet and/or other network for client computer systems. The client computer systems 602, 604, 618, and 620 may each, with appropriate web browsing software, access data, such as HTML documents (e.g., Web pages), which may be provided by the Web server 628. Such data may provide media, such as QuickTime movies, which may be presented by the client computer systems 602, 604, 618, and 620.

The ISP 624 provides Internet connectivity to the client computer system 602 via a modem interface 606, which may be considered as part of the client computer system 602. The client computer system may be a conventional computer system, such as a Macintosh computer, a "network" computer, a handheld/portable computer, a Web TV system, or other types of digital processing systems (e.g., a cellular telephone having digital processing capabilities). Similarly, the ISP 626 provides Internet connectivity for the client computer systems 604, 618 and 620, although as depicted in FIG. 6, such connectivity may vary between various client computer systems, such as the client computer systems 602, 604, 618, and 620. For example, as shown in FIG. 6, the client computer system 604 is coupled to the ISP 626 through a modem interface 608, while the client computer systems 618 and 620 are part of a Local Area Network (LAN). The interfaces 606 and 608, shown as modems 606 and 608, respectively, in FIG. 6, may be an analog modem, an ISDN modem, a cable modem, a satellite transmission interface (e.g., "Direct PC"), a wireless interface, or other interface for coupling a digital processing system, such as a client computer system, to another digital processing system. The client computer systems 618 and 620 are coupled to a LAN bus 612 through network interfaces 614 and 616, respectively. The network interfaces 614 and 616 may be an Ethernet-type, Asynchronous Transfer Mode (ATM), or other type of network interface. The LAN bus is also coupled to a gateway digital processing system 610, which may provide firewall and other Internet-related services for a LAN. The gateway digital processing system 610, in turn, is coupled to the ISP 626 to provide Internet connectivity to the client computer systems 618 and 620. The gateway digital processing system 610 may, for example, include a conventional server computer system. Similarly, the Web server 628 may, for example, include a conventional server computer system.

The system 600 may allow one or more of the client computer systems 602, 604, 618, and 620 and/or the Web server 628 to provide media data (e.g., video and audio, or video, or audio) to another one or more of the client computer systems 602, 604, 618, and 620 and/or the Web server 628. Such data may be provided, for example, in response to a request by a receiving system, which may be, for example, one or more of the client computer systems 602, 604, 618, and 620. As described herein, such media data may be transferred in the system 600 according hints or hint tracks. Such hints, in one embodiment of the invention, may be created according to a specific format of the media data and/or a specific data communication (e.g., network) protocol(s) to allow, according to one aspect of the invention, packetization of media data.

Figure 7:
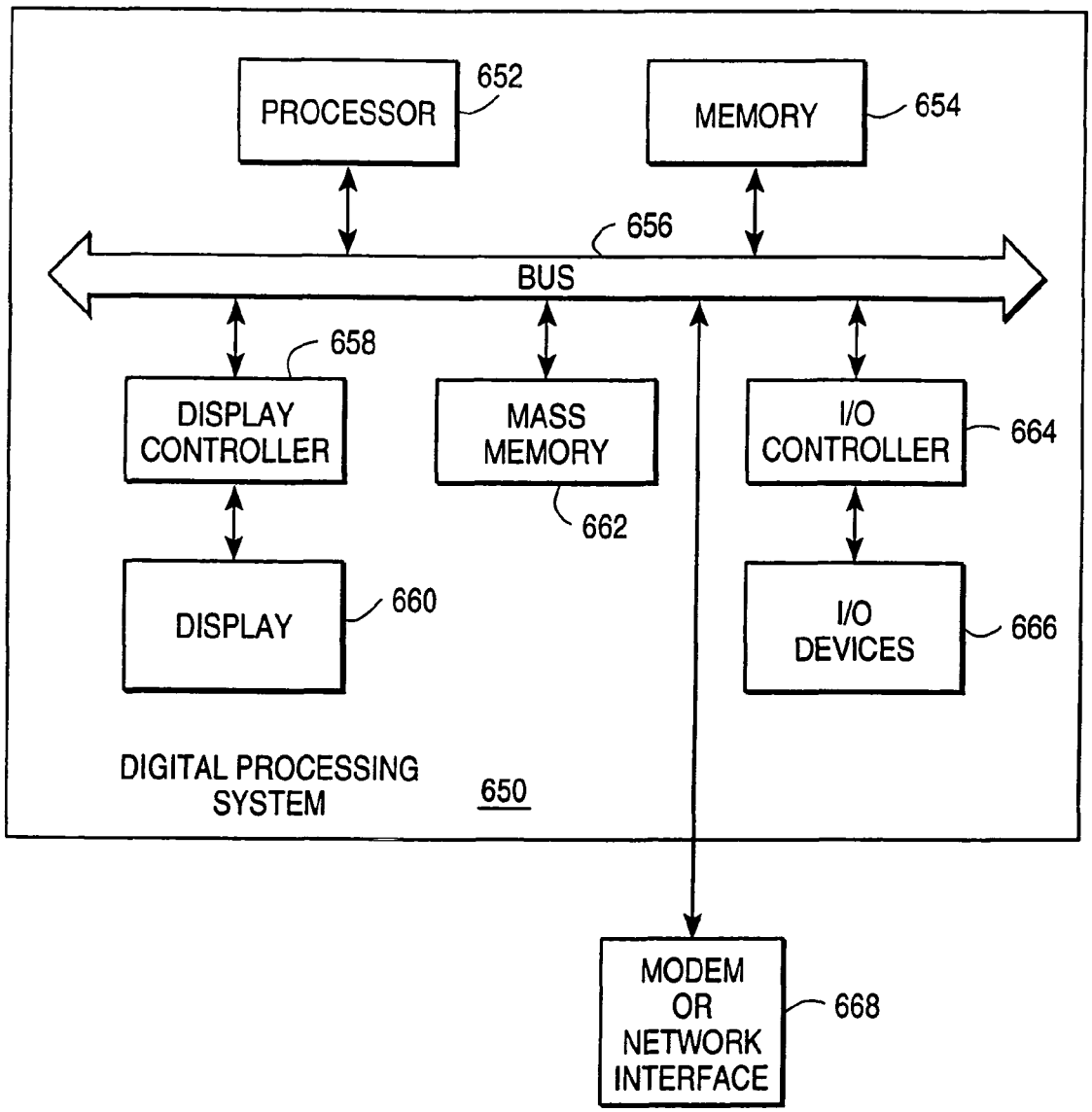
FIG. 7 is a block diagram of a digital processing system which may be used in accordance with one embodiment of the present invention.

FIG. 7 is a block diagram of a digital processing system which may be used in accordance with one embodiment of the present invention. For example, the digital processing system 650 shown in FIG. 7 may be used as a client computer system, a Web server system, a conventional server system, etc. Furthermore, the digital processing system 650 may be used to perform one or more functions of an Internet service provider, such as the ISP 624 or 626. The digital processing system 650 may be interfaced to external systems through a modem or network interface 668. It will be appreciated that the modem or network interface 668 may be considered as part of the digital processing system 650. The modem or network interface 668 may be an analog modem, an ISDN modem, a cable modem, a token ring interface, a satellite transmission interface, a wireless interface, or other interface(s) for providing a data communication link between two or more digital processing systems.

The digital processing system 650 includes a processor 652, which may represent one or more processors and may include one or more conventional types of such processors, such as a Motorola PowerPC processor, an Intel Pentium (or x86) processor, etc. A memory 155 is coupled to the processor 652 by a bus 656. The memory 155 may be a dynamic random access memory (DRAM) and/or may include static RAM (SRAM). The processor may also be coupled to other types of storage areas/memories (e.g., cache, Flash memory, disk, etc.), which could be considered as part of the memory 155 or separate from the memory 155.

The bus 656 further couples the processor 652 to a display controller 658, a mass memory 662, the modem or network interface 668, and an input/output (I/O) controller 664. The mass memory 662 may represent a magnetic, optical, magneto-optical, tape, and/or other type of machine-readable medium/device for storing information. For example, the mass memory 662 may represent a hard disk, a read-only or writeable optical CD, etc. The display controller 658 controls in a conventional manner a display 660, which may represent a cathode ray tube (CRT) display, a liquid crystal display (LCD), a plasma display, or other type of display device. The I/O controller 664 controls I/O device(s) 666, which may include one or more keyboards, mouse/trackball or other pointing devices, magnetic and/or optical disk drives, printers, scanners, digital cameras, microphones, etc.

It will be appreciated that the digital processing system 650 represents only one example of a system, which may have many different configurations and architectures, and which may be employed with the present invention. For example, Macintosh and Intel systems often have multiple busses, such as a peripheral bus, a dedicated cache bus, etc. On the other hand, a network computer, which may be used as a digital processing device of the present invention, may not include, for example, a hard disk or other mass storage device, but may receive routines and/or data from a network connection, such as the modem or interface 668, to be processed by the processor 652. Similarly, a Web TV system, which is known in the art, may be considered to be a digital processing system of the present invention, but such a system may not include one or more I/O devices, such as those described above with reference to I/O device(s) 666. Additionally, a portable communication and data processing system, which may employ a cellular telephone and/or paging capabilities, may be considered a digital processing system which may be used with the present invention.

In the system 650 shown in FIG. 7, the mass memory 662 (and/or the memory 654) may store media (e.g., video, audio, movies, etc.) which may be processed according the present invention (e.g., by way of hints). Alternatively, media data may be received by the digital processing system 650, for example, via the modem or network interface 668, and stored and/or presented by the display 660 and/or I/O device(s) 666. In one embodiment, packetized media data may be transmitted across a data communication network, such as a LAN and/or the Internet, in accordance with hint tracks. On the other hand, the processor 652 may execute one or more routines to use a file with one or more hint tracks, or alternatively, to create one or more hint tracks, to process media (e.g., a pre-packaged movie, audio file, video file, etc.) for presentation or packetization according to the hint tracks. Such routines may be stored in the mass memory 662, the memory 664, and/or another machine-readable medium accessible by the digital processing system 650. In one embodiment, the digital processing system 650 may process media data having hint tracks embedded therein. Similarly, such embedded media data may be stored in the mass memory 662, the memory 664, and/or another machine-readable medium accessible by the digital processing system 650.

Figure 8:
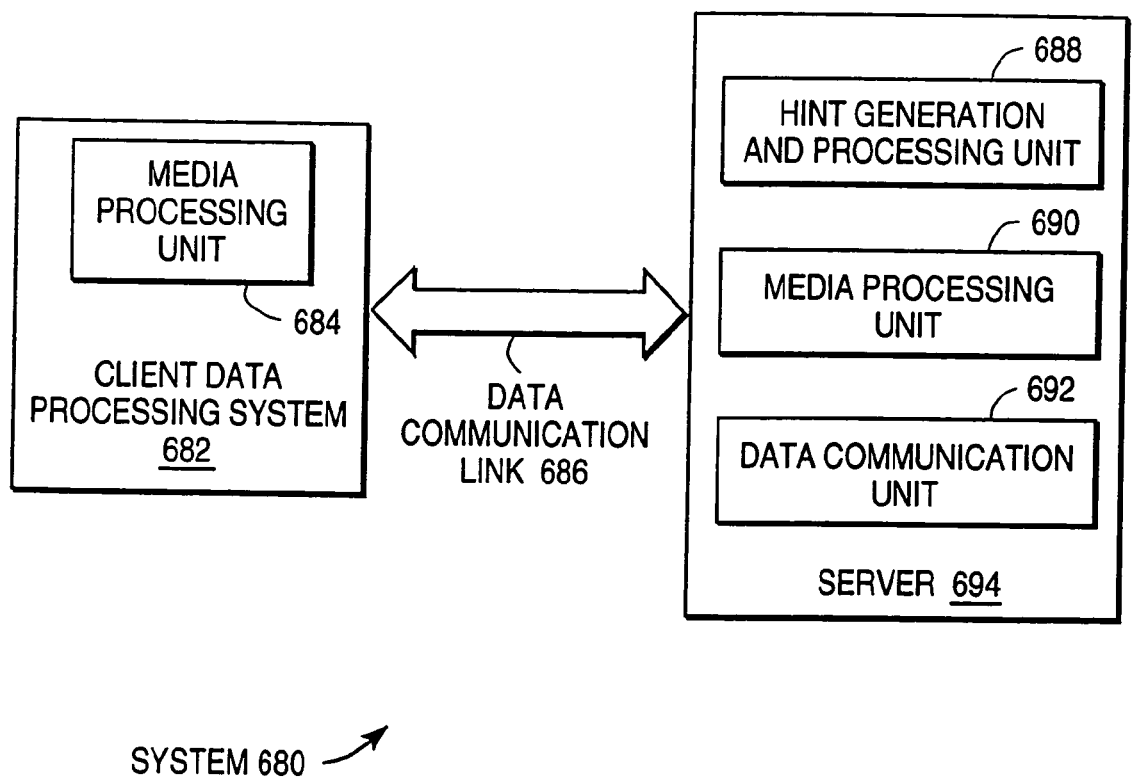
FIG. 8 is a block diagram of a system that utilizes hints to transfer media data, according to one embodiment of the invention.

FIG. 8 is a block diagram of a system that utilizes hints to transfer media data, according to one embodiment of the invention. The system 680 shown in FIG. 8 includes a receiving system, which is depicted as a client data processing system 682 coupled to a server 694, via a data communication link 686. The server 694 and/or client data processing system may, for example, represent one or a combination of the devices/systems described with reference to FIGS. 6 and 7.

The server 694 includes a hint generation and processing unit 688, a media processing unit 690, and a data communication unit 692, each of which may include hard-wired circuitry or machine-executable instructions or a combination thereof. Furthermore, at least a portion of such hard-wired circuitry and/or machine-executable instructions may be shared between a combination of the hint generation and processing unit 688, the media processing unit 690, and the data communication unit 692. In one embodiment, at least one storage area/memory (e.g., a machine-readable medium) having appropriate routines and/or data stored therein coupled to at least one processor is utilized, at least in part, to implement one or a combination of the hint generation and processing unit 688, the media processing unit 690, and the data communication unit 692.

In one embodiment, the hint generation and processing unit 688 creates and stores hints for packetization of media data processed by the media processing unit 690. As described above, the hints may be generated and stored as a separate file, relative to media files or may be embedded with media data. If more than one media format is to be processed, an appropriate format may be taken into consideration by the hint generation and processing unit 688 to generate the hints. Information about the media format may be provided by the media processing unit 690, which may also provide the media data (e.g., media files of video, audio, or video and audio, etc.). Similarly, the data communication unit 692 may provide one or more data communication (e.g., network) protocols for exchange of such media data, packetized according to the hints, via the data communication link 686. As such, the hint generation and processing unit may determine, based on media format information provided by the media processing unit 690 and data communication protocol information provided by the data communication unit 692, appropriate hints and packetization of media and/or the hints for transfer to a receiving digital processing system, such as the client data processing system 682. In one embodiment, the streaming of the media and hints is done in accordance with the QuickTime format.

In response to media data and hint packets received via the data communication link 686, the client data processing system 682 may present a media object represented by the media data. Such presentation may be performed ephemerally, as described above. In one embodiment of the invention, the media data may optionally be stored by the client data processing system 682 and reassembled, for example, at a later time, for presentation and/or transmission by the client data processing system 682.

Figure 9:
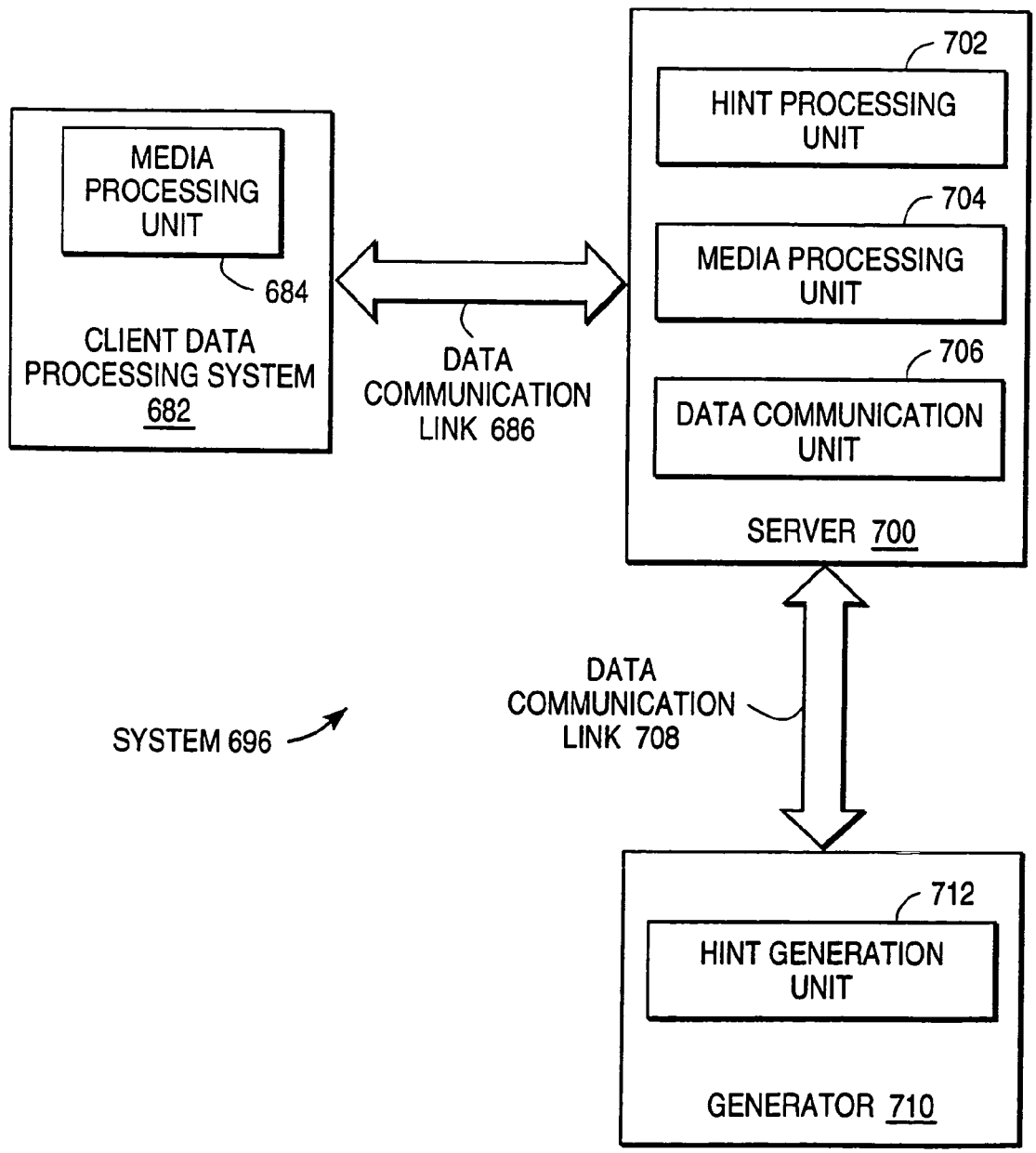
FIG. 9 is a block diagram of a system that utilizes hints to transfer media data, according to one embodiment of the invention.

FIG. 9 is a block diagram of a system that utilizes hints to transfer media data, according to one embodiment of the invention. In particular, FIG. 9 depicts an embodiment of the invention wherein a separate digital processing system, referred to as a generator, may generate hints (or hint tracks) to provide to another system, such a server, that uses the hints to packetize media data for transfer to another system, such as a client computer system. A system 696 is shown in FIG. 9, which includes a server 700 which may exchange data, via the data communication link 686, with the client data processing system 682. However, in the embodiment shown in FIG. 9, the server 700 does not generate the hints. Rather, a generator 710, coupled to the server 700 by a data communication link 708, includes a hint generation unit 712 to generate hints that are used to packetize media data.

In one embodiment, the operation of the system 696 is as follows: the server 700 makes a request to the generator 710 to generate hints for one or more media files containing media data. For example, the media files may be stored in the server 700 on a machine-readable medium. The request may include information to indicate the format of the media file and/or a data communication protocol for transmission of the media data and/or other data. The data communication protocol may be related to the data communication link 686, which may, in one embodiment of the invention, be associated with a network connection having particular physical and logical characteristics to facilitate exchange of media and/or other data between the server 700 and the client data processing system 682. In response to the request, the hint generation unit 712 generates appropriate hints, which may be associated with a time-related hint track, and provides the hints to the server 700. In response to the hints received from the generator 710, via the data communication link 708, the server 700, and in particular, a hint processing unit 702 uses the hints to packetize the media data for transmission to the client data processing system 682.

In response to media data and hint packets received via the data communication link 686, the client data processing system 682 may present a media object represented by the media data. Such presentation may be performed ephemerally, as described above. In one embodiment of the invention, the media data may optionally be stored by the client data processing system 682 and reassembled, for example, at a later time, for presentation and/or transmission by the client data processing system 682.

Figure 10:
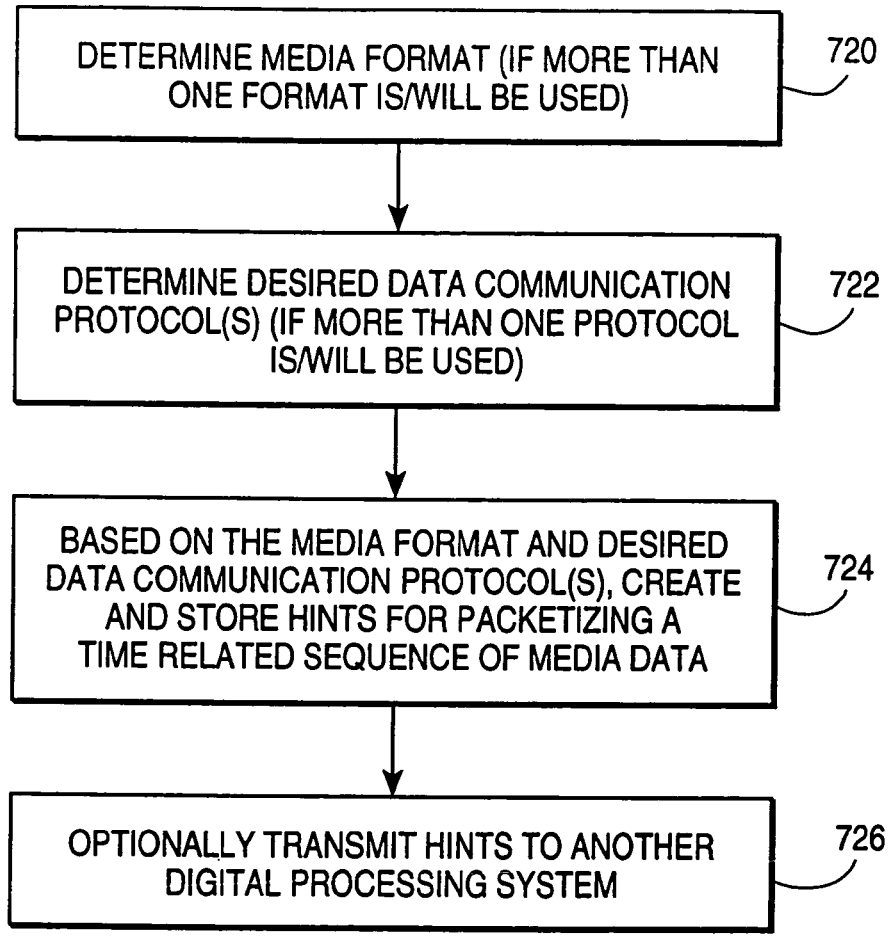
FIG. 10 is a flow diagram illustrating a method for generating hints for providing media data transmission, according to one embodiment of the invention.

FIG. 10 is a flow diagram illustrating a method for generating hints for providing media data transmission, according to one embodiment of the invention. In step 720, a media format is determined for media data to be transmitted, if more than one format will be used. If only one format is used, 720 may not be performed. In step 722, an appropriate data communication protocol(s) is determined, again, assuming that more than one (protocol) may be used. In step 724, based on the media format and the data communication protocol(s) (one or both of which may have been selected/configured), hints (e.g., hint tracks) related to media data transmission are created and stored.

In step 726, which is optional, the hints may be transmitted to another digital processing system. In one embodiment of the invention, for example, the method of FIG. 10, at least in part, may be performed exclusively by one digital processing system (e.g., a server). In an alternative embodiment, the method of FIG. 10, at least in part, may be performed by two or more digital processing systems. For example, attributes of media data may be provided by a server or other system to another digital processing system, such as a generator. In response, the generator may determine, based on the attributes, an appropriate media format, data communication protocol(s), and hints for packetization of media data, which may be stored at the server. Alternatively, the server may provide the appropriate media format and protocol(s) to the generator, which could then generate hints. The generator may transmit the hints to the server or other digital processing system, which could packetize media data according to the hints.

Figure 11:
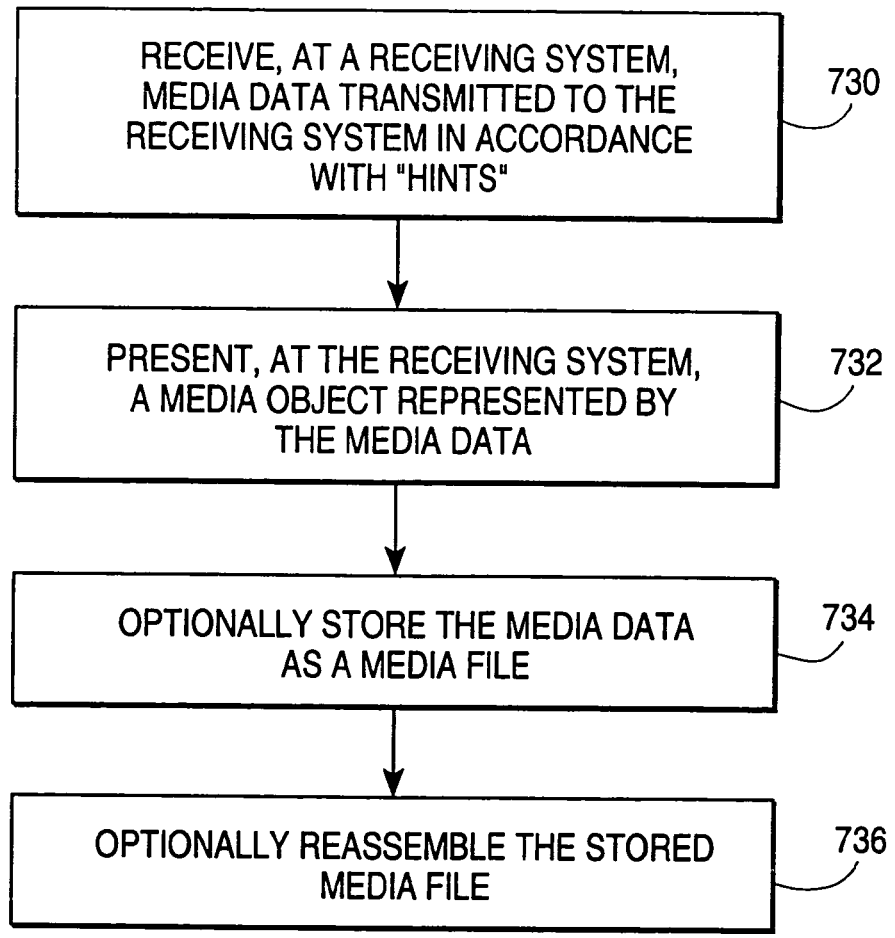
FIG. 11 is a flow diagram illustrating a method of processing media data received by a receiving system in accordance with hints, according to one embodiment of the invention.

FIG. 11 is a flow diagram illustrating a method of processing media data received by a receiving system in accordance with hints, according to one embodiment of the invention. In step 730, media data transmitted according to a receiving system in accordance with hints or hint tracks is received by the receiving system. In one embodiment, the receiving system may receive packetized media data, as well as packetized hint tracks. The hint tracks, in one embodiment of the invention, may be associated with at least portions of the media data. Such data may be received by the receiving system in response to a request that may be made by the receiving system. For example, in one embodiment, the receiving system may be a client computer system and the request may be made to a server or other digital processing system for the media data. In response, the server may generate (or have generated for it by a separate digital processing system) hints for packetizing the media data, and transmit the packetized media data, which may include hints, to the receiving system.

In step 732, a media object represented by the media data received by the receiving system is presented by the receiving system. For example, the media data may include video, audio, or combination thereof that is "presented" by the receiving system, for example, on a display and speaker(s). As mentioned above, the media data may be associated with a QuickTime movie.

Optionally, in step 734, the media data, which may include hints, may be stored by the receiving system as a media file(s). Thus, in alternative embodiments of the invention, step 732 may not be performed as the media data is received, or may be performed before, after, or in parallel with step 734.

In step 734, the stored media file may optionally be reassembled and/or presented. As such, step 732 may be performed subsequent to step 734.

Figure 12:
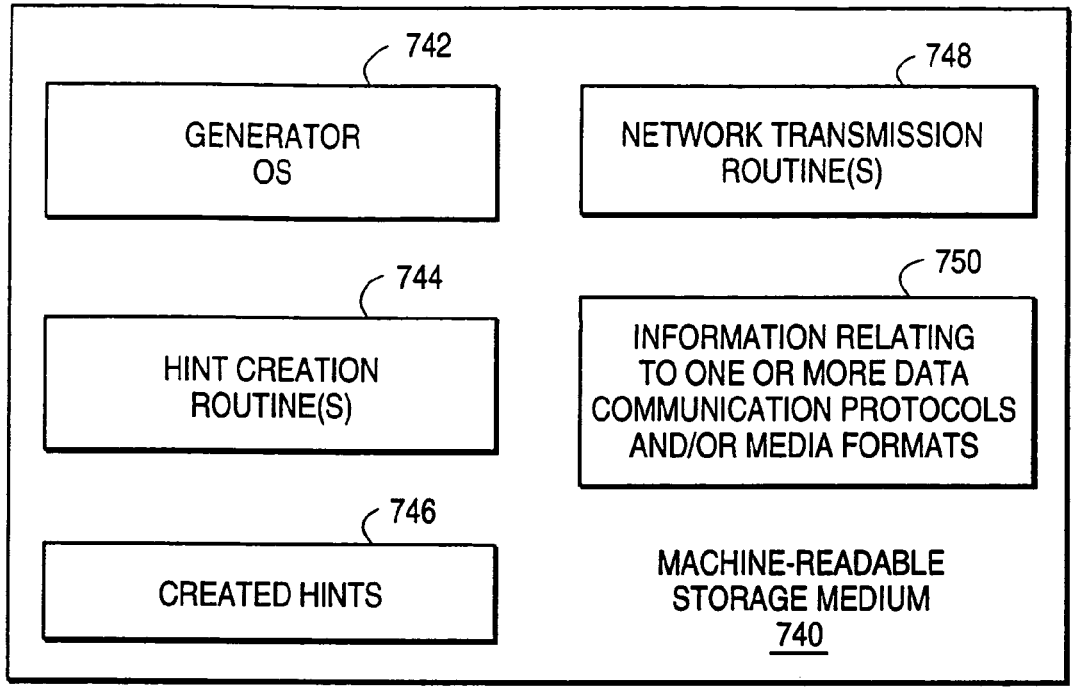
FIG. 12 is an example of a machine readable storage medium that may be accessed by a digital processing system, such as a generator, according to one embodiment of the invention.

FIG. 12 is an example of a machine readable storage medium that may be accessed by a digital processing system, such as a generator, according to one embodiment of the invention. It will be appreciated that the actual memory that stores the elements shown in and described below with reference to FIG. 12 may be one or several elements, such as one or more disks (which may, for example, be magnetic, optical, magneto-optical, etc.), the memory 654 and/or the mass memory 662 described above with reference to FIG. 7. Furthermore, in one embodiment where the generator, with which the machine readable storage medium shown in FIG. 12 is associated, is a network computer, one or more of the elements of the machine readable storage medium may be stored at another digital processing system and downloaded to the generator. Furthermore, the elements described with reference to the machine readable storage medium may, at some point in time, be stored in a non-volatile mass memory (e.g., a hard disk). Conversely, at other times, the elements of the machine storage medium may be dispersed between different storage areas, such as DRAM, SRAM, disk, etc.

FIG. 12 shows a machine readable storage medium 740. In one embodiment, the machine readable storage medium is utilized, at least in part, by a digital processing system that generates hints or hint tracks, i.e., a generator, in accordance with one or more method(s) of the invention. The generator, as described with reference to FIG. 8, may be integrated into a digital processing system that transmits media data according to the hint tracks, or may be, as described with reference to FIG. 9, a digital processing system that creates and provides the hints to another digital processing system, such as a server, which utilizes the hints to packetize and transmit media data.

As shown in FIG. 12, the machine readable storage medium 740 typically includes a number of elements. For example, the machine readable storage medium 740 includes software for providing operating system functionality to the generator, as depicted by a generator operating system (OS) 742. A network transmission routine(s) 748 provides data communication functionality, such as routines, protocols, etc., to allow the generator to transmit and receive data via a data communication link.

In addition, the machine readable storage medium 740 includes routines and data for creating hints associated with media transmission. As such, the machine readable storage medium 740 may optionally include information 750, which may provide information relating to one or more data communication protocols and media formats which may be necessary for creation of hints by a hint creation routine(s) 744. For example, the information 750 may include information relating to QuickTime movies, RTP, MPEG, etc. However, such information may, at least in part, be integrated into the hint creation routine 744 and/or be provided to the generator by a remote digital processing system.

The hints created by the hint creation routine(s) 744 may be stored as created hints 746 and/or stored/transmitted elsewhere (e.g., at a remote digital processing device, which may be a server). The hints are hint tracks that are time-related for packetization and transmission of media data, which is also time-related (e.g., video, audio, video and audio, etc.).

Although the machine readable storage medium 740 is described with reference to a generator, the medium 740, at least in part, may be part of a number of types of digital processing systems, data storage media, etc. For example, the machine readable storage medium 740, at least in part, may be included as part of a server or other digital processing system. Furthermore, the machine readable storage medium 740, at least in part, may be included as part of a software utility on one or more disks or other machine readable media.

Figure 13:
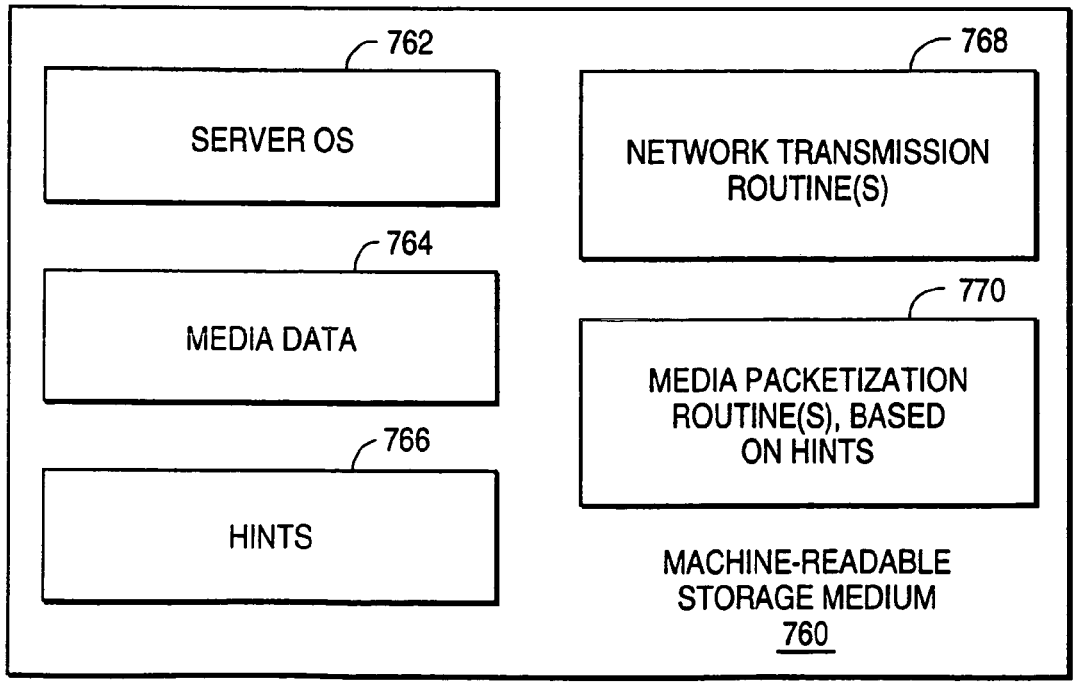
FIG. 13 is an example of a machine readable storage medium that may be accessed by a digital processing system, such as a server, according to one embodiment of the invention.

FIG. 13 is an example of a machine readable storage medium that may be accessed by a digital processing system, such as a server, according to one embodiment of the invention. It will be appreciated that the actual memory that stores the elements shown in and described below with reference to FIG. 13 may be one or several elements, such as one or more disks (which may, for example be magnetic, optical, magneto-optical, etc.), the memory 654 and/or the mass memory 662 described above with reference to FIG. 7. Furthermore, in one embodiment where the server, with which the machine readable storage medium shown in FIG. 13 is associated, is a network computer, one or more of the elements of the machine readable storage medium may be stored at another digital processing system and downloaded to the server. Furthermore, the elements described with reference to the machine readable storage medium may, at some point in time, be stored in a non-volatile mass memory (e.g., a hard disk). Conversely, at other times, the elements of the machine storage medium may be dispersed between different storage areas, such as DRAM, SRAM, disk, etc.

FIG. 13 shows a machine readable storage medium 760. In one embodiment, the machine readable storage medium is utilized, at least in part, to packetize media data for transmission on a data communication link in accordance with one or more method(s) of the invention. The machine readable storage medium 760 may be associated with a server, such as the server 694 described with reference to FIG. 8, to include routines to create hint tracks and transmit media data according to the hint tracks. In another embodiment, the machine readable storage medium 760 may be associated with a digital processing system, such as the server 700 described with reference to FIG. 9, wherein a digital processing system, such a generator, includes routines to create hints, and the server, using the hints as processed by routines provided by the machine readable storage medium 760, may packetize and transmit media data.

The machine readable storage medium 760 includes a number of elements. For example, the machine readable storage medium 760 includes software for providing operating system functionality to the server, as depicted by a server operating system (OS) 762. A network transmission routine(s) 768 provides data communication functionality, such as routines, protocols, etc., to allow the server to transmit and receive data via a data communication link.

In addition, the machine readable storage medium 760 includes a media packetization routine 770 for packetizing media data, which may be time-related, based on hints, and which may also be packetized. Accordingly, the machine readable storage medium 760 includes a media data storage area 764 and a hint storage area 766 to store media data (which may, for example, be QuickTime movies or other media tracks) and hints (e.g., hint tracks), respectively. The hints may include hint tracks that are time-related for packetization and transmission of media data, which is also typically time-related (e.g., video, audio, video and audio). In one embodiment, the hint tracks are packetized separately from the media data packets. In one embodiment, hints include pointer information identifying media data (e.g., a particular packet(s)) which may be in a separate media file.

Figure 14:
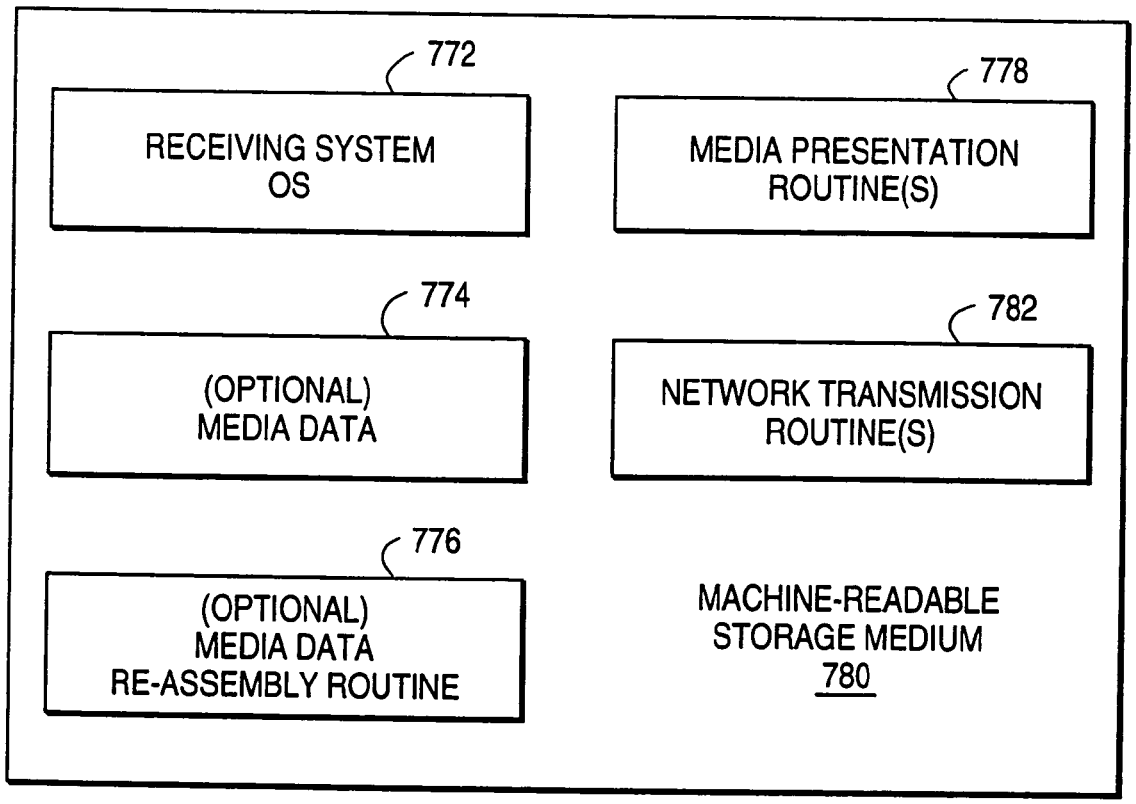
FIG. 14 is an example of a machine readable storage medium that may be accessed by a digital processing system, such as a receiving system or other digital processing system, according to one embodiment of the invention.

FIG. 14 is an example of a machine readable storage medium that may be accessed by a digital processing system, such as a receiving system or other digital processing system, according to one embodiment of the invention. It will be appreciated that the actual memory that stores the elements shown in and described below with reference to FIG. 14 may be one or several elements, such as one or more disks (which may, for example be magnetic, optical, magneto-optical, etc.), the memory 654 and/or the mass memory 662 described above with reference to FIG. 7. Furthermore, in one embodiment where the receiving system, with which the machine readable storage medium shown in FIG. 14 is associated, is a network computer, one or more of the elements of the machine readable storage medium may be stored at another digital processing system and downloaded to the receiving system. Furthermore, the elements described with reference to the machine readable storage medium may, at some point in time, be stored in a non-volatile mass memory (e.g., a hard disk). Conversely, at other times, the elements of the machine storage medium may be dispersed between different storage areas, such as DRAM, SRAM, disk, etc.

FIG. 14 shows a machine readable storage medium 780. In one embodiment, the machine readable storage medium is utilized, at least in part, to process media data packetized in accordance with one or more method(s) of the invention. The machine readable storage medium 780 may be associated with a receiving system, such as the client data processing system 682 described with reference to FIGS. 8 and 9, to include routines to present media data transmitted/received according to hints. Alternatively, the machine readable storage medium 780 may include media data having hints (e.g., hint tracks) embedded therein. Such embedded media data may be pre-packaged or generated by a routine stored on a machine readable storage medium, such as the machine readable storage medium 780.

The machine readable storage medium 780 may include a number of elements. For example, the machine readable storage medium 780 includes software for providing operating system functionality to the receiving system, as depicted by a server operating system (OS) 772. A network transmission routine(s) 782 provides data communication functionality, such as routines, protocols, etc., to allow the server to transmit and receive data via a data communication link.

In addition, the machine readable storage medium 780 includes a media presentation routine 778 for presenting media data packetized according to hints. Thus, the machine readable storage medium 780, and in particular, the media presentation routine 778, may include routines for decompression of audio and/or video data, displaying of video, and/or playing back audio, etc. Furthermore, the media presentation routine 778 typically provides handling of hints that are associated with the media data. In one embodiment, the hints are simply ignored as media is presented.

Optionally, the machine readable storage medium 780 may store media data that has been packetized according to hints as media data 774, and include a media data reassembly routine 776 to reassemble to the stored media data (e.g., to be presented, transmitted, etc.).

Figure 15:
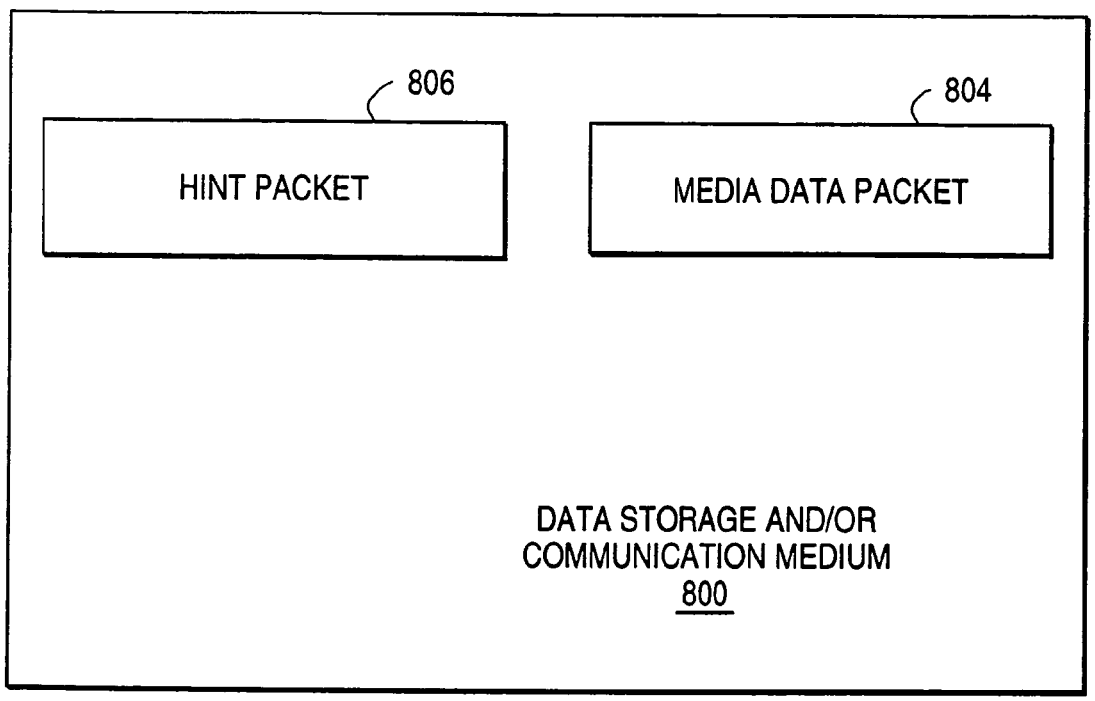
FIG. 15 is a diagram of a data storage and/or communication medium having stored/transported thereon media and hint information, according to one embodiment of the invention.

FIG. 15 is a diagram of a data storage and/or communication medium having stored/transported thereon media and hint information, according to one embodiment of the invention. A data storage and/or communication medium (medium) 800 is shown, which represents various types of transport and/or storage medium in which a media data packet 804 and a hint packet 806 packetized according to the present invention could be stored or transported. For example, the medium 800 may represent the mass memory 662 and/or the memory 654, described above with reference to FIG. 7. The medium 800 may also represent a communication medium, such as the LAN bus 612 shown in FIG. 6 or the data communication link 686 for transporting data/signals representing media and/or other information.

The hint packet 806 and the media packet 804 may be integrated into one packet or be stored and/or transported separately, as depicted in FIG. 15. Furthermore, the hint packet 806 and the media packet 804 may embody several types of formats, such as ones described herein or one associated with other media formats, network protocols, and/or digital processing device architecture.

Extractor Tracks

Figure 16A:
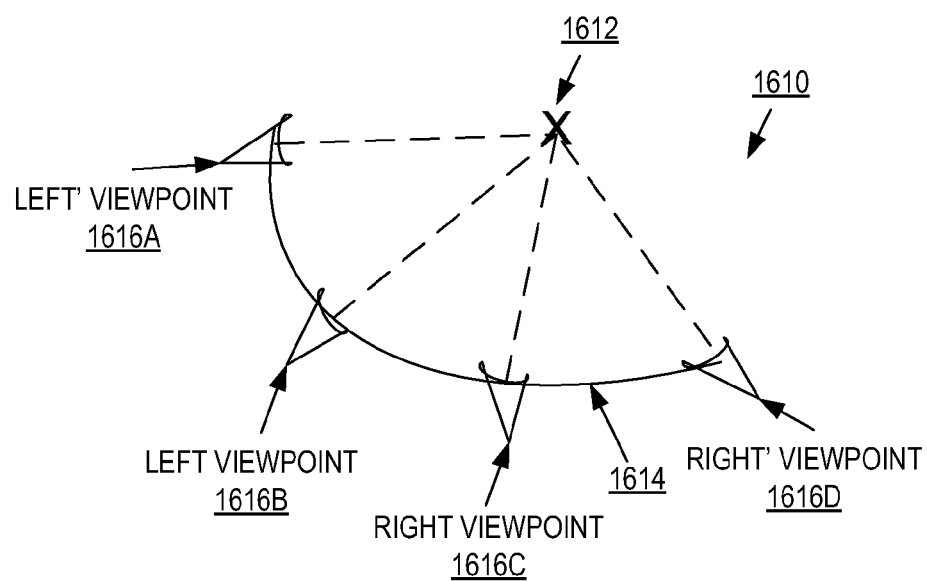
FIG. 16A illustrates one embodiment of a multiview coded (MVC) coded video base track.

Similar to hints tracks, video tracks may be used to indicate multiple media streams available in multiview coded media. Multiview coded (MVC) media is one that stores multiple viewpoints of the same video content. For example, multiview coded media can store video streams suitable for single or flat view, three dimensional video, free viewpoint video, high performance imaging, etc. For example, a multiview coder receives N temporally synchronized video streams and generates one MVC bitstream. The MVC decoder receives this bitstreams, decodes and outputs the N video streams. In this example, each of the N video bitstreams represents a different viewpoint of the same video subject matter. One example of a multiview coded media is multiview video coding used with the H.264/MPEG-4 AVC video codec, as illustrated in FIG. 16A. MVC is used to indicate multiple video streams coded into a single MVC base video track. Each video stream available from an MVC base video track corresponds to a video operating point. In one embodiment, a video operating point corresponds to a particular view of the video, such as two-dimensional video view, three-dimensional video, free videopoint view, etc. For example, and in one embodiment, a two-dimensional video view is a single (or flat) view. An example of two-dimensional video is standard AVC video produced using the H.264/MPEG-4 AVC video codec. In this example, the two-dimensional video is composed of one video stream. In an alternate embodiment, three-dimensional video offers a three dimensional depth impression of the observed scenery in the video. Three-dimensional video is used in video conferencing, three-dimensional televisions, three-dimensional movies, and higher performance imaging. In this example, the three-dimensional video is composed of two video streams, one for a left view and another for a right view. In another embodiment, free viewpoint video allows for an interactive selection of viewpoints and direction within defined operating ranges of the multiview coded media. In this embodiment, the free viewpoint video is composed of a video stream for each different viewpoint. For example, a free viewpoint video can have four or more viewpoints resulting in four different video streams. Free video viewpoint is further described with reference to FIG. 16A below. Each video stream for the different multiview applications can be of varying temporal, spatial, and/or quality characteristics. For example and by way of illustration, temporal video attributes describe the video stream frame rate (e.g., 8, 15, 30 fps, etc.), spatial video attributes describe the video stream resolution (e.g., SQCIF, QCIF, CIF, etc.), and quality video attributes describe the video stream quality, typically described in a signal-to-noise metric. Multiview video coding is further described in "Introduction to Multiview Video Coding" by Aljoscha Smolic (http://www.chiariglione.org/mpeg/technologies/mp04-mvc/index.htm).

FIG. 16A illustrate one embodiment of multiple views 1610 of a subject 1612. In FIG. 16A, different views 1616A-D are arranged in a concave semi-circle 1614. While in FIG. 16A four different views are illustrated, in alternate embodiment, more or less views can be used and/or arranged in the same or a different fashion. In one embodiment, a different video stream is collected at each of the different viewpoints 1616A-D to support different multiview applications. For example, and in one embodiment, left viewpoint 1616B is used to collect video for a two dimensional video stream. In another embodiment, left viewpoint 1616B and right viewpoint 1616C is used to collect video for a three dimensional video stream. A three dimensional video stream is also referred to as a stereo video stream. In another embodiment, left' viewpoint 1616A, left viewpoint 1616B, right viewpoint 1616C, and right' viewpoint 1616C is used to collect video for a free viewpoint video stream. In this embodiment, with four viewpoint used for the free viewpoint video stream, this video stream is also referred to as a quad video stream. In alternate embodiments, a free viewpoint video stream may have more or less viewpoints. As illustrated in FIG. 16A, different viewpoint video streams can be built from other viewpoint video streams. For example, a three dimensional video stream can be built from two dimensional video stream (e.g. video stream at left viewpoint 1616B) and a video stream from right viewpoint 1616C. As another example, a free viewpoint video stream can be built from video stream used to build three dimensional video stream (e.g. video stream at left viewpoint 1616B and video stream at right viewpoint 1616C) and video stream from left' and right' viewpoints (1616A and 1616D, respectively).

Figure 16B:
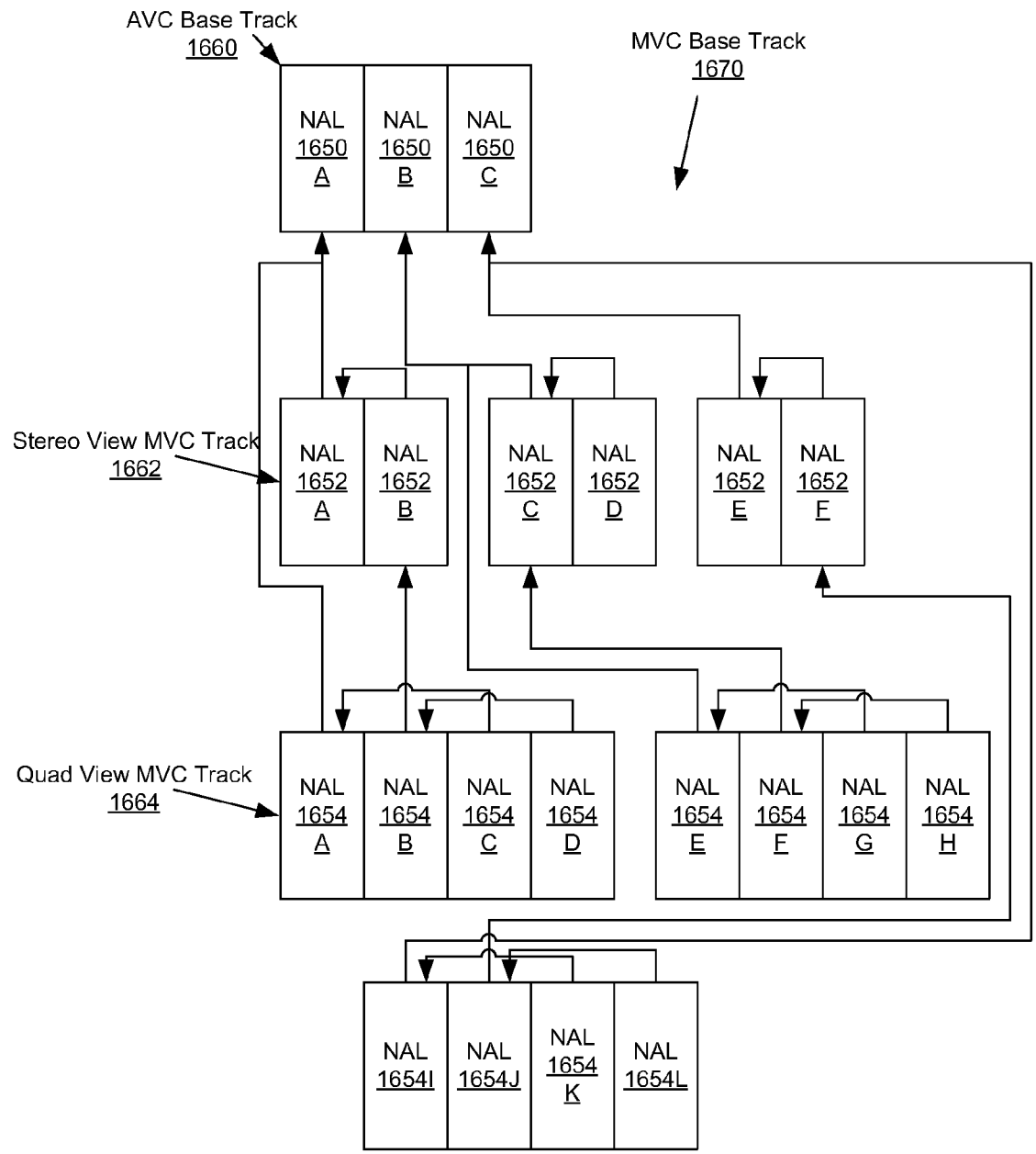
FIG. 16B is a block diagram illustrating one embodiment of varying video views.

FIG. 16B illustrated one embodiment of an MVC coded video base track 1670. In FIG. 16B, MVC base track is composed of AVC track 1660, stereo view MVC track 1662, and quad view MVC track 1664. In one embodiment, AVC base track 1660 represents a two dimensional video stream, stereo view MVC track 1662 represents a three dimensional video stream, and quad view MVC track 1664 represents a free viewpoint video stream. AVC base track 1660 is composed of NAL units 1650A-C. Each of the NAL units is a partition of the video base track into units appropriate for a variety of communication channels and/or storage media. Stereo view MVC track comprises NAL units 1652A-F. In one embodiment, some of NAL units 1652A-F are reference NAL units and other NAL units are non-reference units that contain video data. For example, NAL units 1652A, 1652C, and 1652E reference NAL units 1650A-C, respectively. In this embodiment, NAL units 1652A, 1652C, and 1652E represent the video for the left viewpoint used for a three dimensional video stream. Furthermore, in this embodiment, NAL units 1652B, 1652D, and 1652F represent the video used for the right viewpoint in the three dimensional video stream.

Thus, in this embodiment, the stereo MVC track 1662 builds a three dimensional video stream using the two dimensional video stream of the AVC track 1660. In an alternate embodiment, stereo view MVC track 1662 includes NAL units 1652A-F that do not reference other NAL units, but instead contain the data in the respective NAL units.

Quad view MVC track 1664 is composed of NAL units 1654A-L. In one embodiment, some of NAL units 1654A-L reference other NAL units in stereo view AVC track 1660 and/or MVC track 1662. For example and in one embodiment, NAL units 1654A, 1654E, and 1654I reference NAL units 1650A-C, respectively of AVC track 1660. NAL units 1654B, 1654F, and 1654J reference NAL units 1652B, 1652D, and 1652F respectively, of stereo view MVC track 1662. In another embodiment, NAL units 1654A, 1654E, and 1654I reference 1652A, 1652C, and 1652E respectively, of stereo view MVC track 1662. In this embodiment, NAL units 1652A, 1652E, and 1652I reference the left viewpoint of stereo view MVC track 1662.

NAL units 1652B, 1652F, and 1652J reference the right viewpoint of stereo view MVC track 1662. NAL units 1652C, 1652G, and 1652K contain video data for the left' viewpoint (e.g., left' viewpoint 1616A in FIG. 16A above) and NAL units 1652D, 1652H, and 1652L contain video data for the right' viewpoint (e.g., right' viewpoint 1616D in FIG. 16D above). In an alternate embodiment, stereo view MVC track 1662 includes NAL units 1652A-F that do not reference other NAL units, but instead contain the data in the respective NAL units.

Figure 16C:
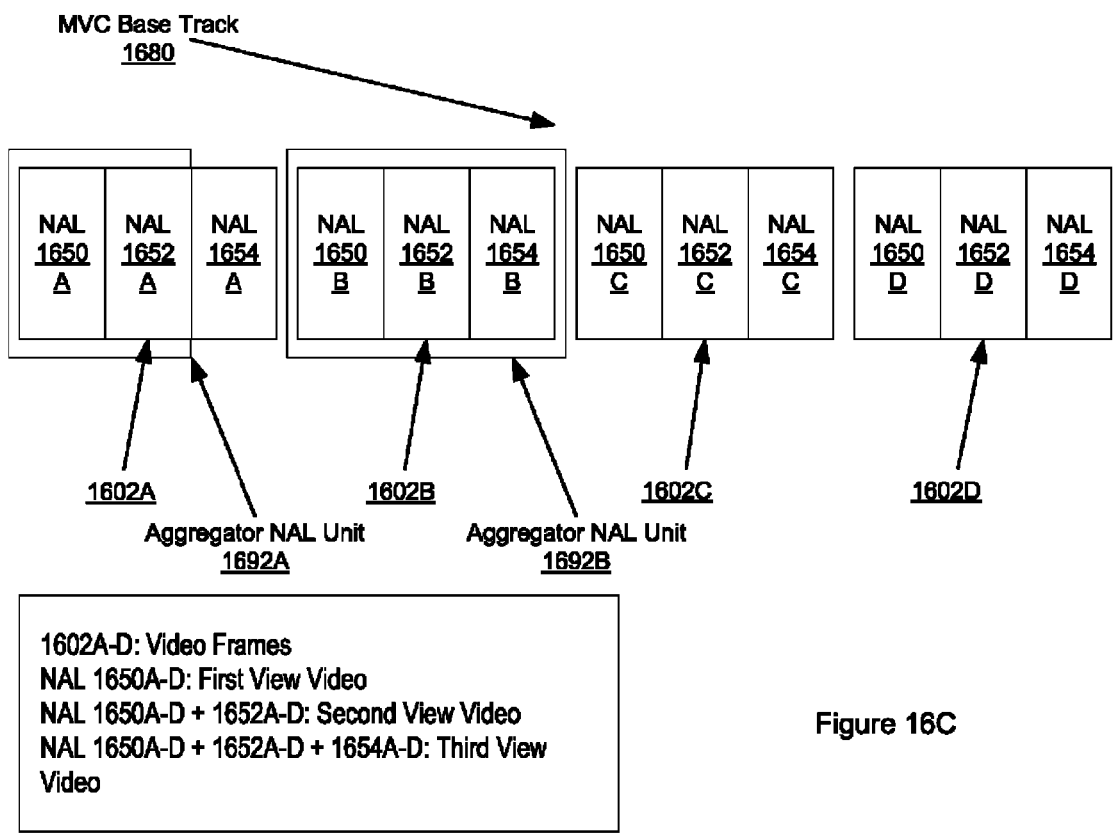
FIG. 16C illustrates one embodiment of an MVC coded video base track utilizing aggregator network abstraction layer units.

FIG. 16C illustrates one embodiment of an MVC coded video base track 1670. In FIG. 16B, the MVC base track 1670 is broken up into separate frames 1602A-D. Each frame 1602A-D comprises one or more network abstraction layer (NAL) units 1650A-D, 1652A-D, 1654A-D. The NAL units are a partition of the video base track into units appropriate for a variety of communication channels and/or storage media. Each set of NAL units 1650A-D, 1652A-D, 1654A-D can be used for different viewpoint video streams. For example and by way of illustration, NAL units 1650A-D comprise an initial viewpoint media stream, such as a single viewpoint video. This single viewpoint video is used for delivering a two-dimensional video of a given subject Combining NAL units 1650A-D and 1652A-D give a different video stream that is of a second viewpoint video (e.g., a three dimensional video stream).

Using the three sets of NAL units 1650A-D, 1652A-D, 1654A-D yields a third viewpoint video stream video stream (e.g., one of the video streams for the free viewpoint video). As illustrated in FIG. 16C, the video stream from NAL units 1650A-D, 1652A-D, 1654A-D gives the third viewpoint video.

Thus, the MVC base track 16700 yields at least three separate video streams from a single video base track. This allows one base coded video track to be used for different applications, or operating points. For example and by way of illustration, first viewpoint video 1660 may be used for streaming video to a device that does not support multiview video, second resolution video 1662 may be used for streaming video to stereo viewer (three-dimensional display, etc.), whereas third resolution video 1664 would be used for streaming video to a device that supports free viewpoint video (special scientific display, etc.).

Because an MVC coded base tracks contains video streams for multiple combinations of viewpoints and views, tracks for each video stream can be stored as one track or separate tracks. With separate tracks, the overhead of managing the potentially large number of separate tracks become unmanageable. For example and by way of illustration, if there are L views, averaging N different viewpoints for each view, then there could be up to L*N different video streams in a single MVC base track. Assembling a stream to feed a video decoder means L*N logical append operations per sample. On the other hand, if the multiple video streams are kept in a single base track, as illustrated in FIG. 16A, to extract a sub-set of a video stream, each video stream in the MVC coded base track must be walked to find the relevant data for the specific video stream sub-set. This means that all the data for the L*N video streams must be accessed to determine the specific video stream sub-set. Furthermore, because a MVC coded base track is typically stored in an ISO file, the data for one video MVC base track is contiguously stored in a frame. Thus, the frames for an MVC base track contain all data and a decoder must read all the data and discard the data it does not use.

On balance, it is preferable to use a single MVC base track (or at least a set of MVC base tracks, each containing scalable content) because the video decoder does not have to process the L*N video streams. However, there are times when it would be useful to have one of the video streams available as a separate contiguous stream. What is needed is a mechanism to extract the video streams available from the MVC base track without walking the entire MVC base track. A form of video tracks (e.g. extractor tracks) can be used to extract the multiple video streams available in a single MVC base track. Each extractor track represents a suggested operating point (e.g. multiview application) and contains information on how to assemble the data needed for that operating point (e.g., resulting video stream) from the MVC base track, while ignoring the rest of the data in MVC base track. In particular, an extractor track may be used for unique combination of a particular multiview application (e.g., two dimensional video, three dimensional video, free viewpoint video, etc.). Although in an exemplary embodiment, extractor tracks are used for multiview coded video (such as a series of related images which are presented in a predetermined sequence at predetermined times over a period of time), alternate embodiment may use extractor tracks for other forms of multiview media (e.g., audio, scenes, etc.).

FIG. 16C further illustrates one embodiment of an MVC coded video base track utilizing aggregator NAL units 1682A-B. In FIG. 16C, MVC base track 1670 is broken up into separate frames 1602A-D. Each frame 1602A-D comprises one or more NAL units 1650A-D, 16521652-D, 1654A-D. The NAL units are a partition of the video base track into units appropriate for a variety of communication channels and/or storage media. Each set of NAL units 1650A-D, 1652A-D, 1654A-D may be used for different video streams. The video stream can differ in viewpoint, views, etc. For example and by way of illustration, NAL units 1650A-D comprise a two-dimensional video stream, etc. Furthermore, in FIG. 16C, some of NAL units 1650A-D, 1652A-D, 1654A-D are organized using aggregator NAL units 1662A-B. Aggregator NAL units 1662A-C are used to organize NAL units into groups of NAL units.

In one embodiment, aggregator NAL unit 1690A-B comprises one or more NAL units, a length, a type, and extra bytes. The length is the length of the initial NAL unit. The type represents the type of NAL unit. The extra bytes represent the extra bytes after the initial NAL unit and are used as an offset to the additional NAL units in the aggregated NAL unit.

In one embodiment, aggregator NAL unit 1692A comprises NAL unit 1650A and 1652A. In this embodiment, aggregator NAL unit 1692A comprises part of video frame 1602A and support extraction of first and second viewpoint video. Alternatively, in another embodiment aggregator NAL unit 1682B comprises NAL units for an entire frame, namely, NAL units 1650B, 1652B, and 1652C. In this alternative embodiment, aggregator NAL unit 1682B supports extraction of the first, second and third viewpoint video.

Figure 17A:
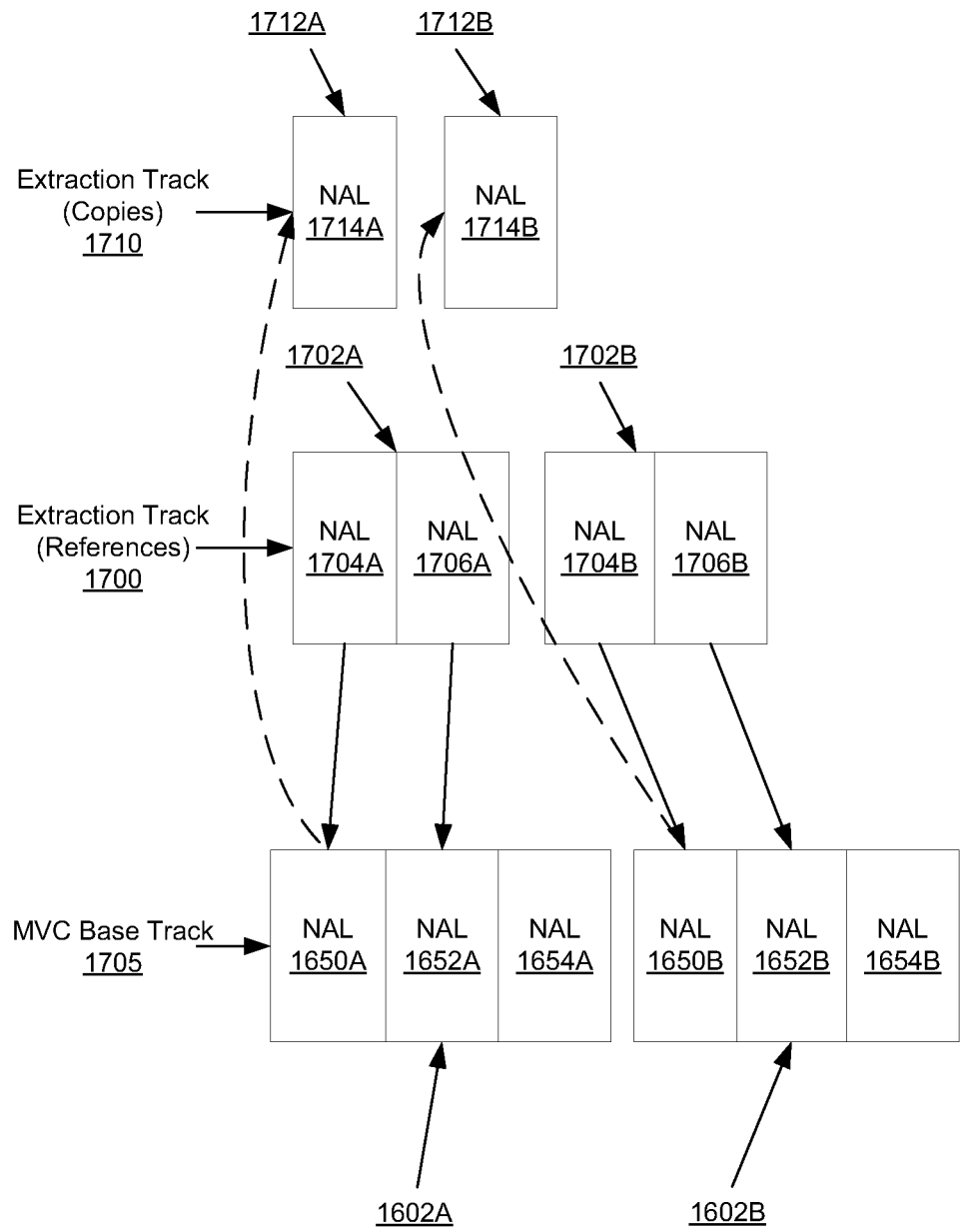
FIG. 17A is a block diagram illustrating one embodiment of extractor tracks used to extract video streams from an MVC coded base track.

FIG. 17A is a block diagram illustrating one embodiment of extractor tracks used to extract video streams from an MVC coded base track 1705. In FIG. 17A, MVC base tracks 1705 comprises video frames 1602A-B, with each video frame 1602A-B comprising NAL units 1650A-B, 1652A-B, 1654A-B that can be used for different video streams. Similar to FIG. 16A, a first resolution video stream is assembled from NAL units 1650A-B (e.g., two-dimensional video stream), a second resolution video stream is assembled from NAL units 1650A-B and 1652A-B (e.g., three dimensional video stream), while a third video stream can be assembled from NAL units 1650A-B, 1652A-B, 1654A-B (e.g., free viewpoint video stream). Unlike FIG. 16A, extraction tracks 1700 and 1710 are used to extract different video streams available in MVC base track 1705. Extractor track 1700 is structured like an AVC and MVC base track because extractor track 1700 is a series of NAL units. Extractor track NAL units can be mixed in with other NAL units. Furthermore, extractor track 1700 has a track reference of 'mvc' that links extractor track 1700 to MVC base track 1705. In addition, extractor track has the same track type as MVC base track 1705.

For example and by way of illustration, extraction track 1700 comprises NAL units 1704A-B, 1706A-B which reference NAL units 1650A-B, 1652A-B, respectively, in MVC base track 1705. NAL units 1704A-B, 1706A-B instruct the video decoder to find the temporally aligned NAL unit in MVC base track 1705 and extract all or part of that NAL unit. For example and by way of illustration, NAL unit 1704A instructs the decoder to find NAL unit 1650A and extract some or all NAL unit 1650A. If NAL unit 1704A instructs the decoder to extract part of NAL unit 1650A, NAL unit 1704A comprises instructions on the number of bytes to retrieve and an offset into NAL unit 1650A. Retrieving only part of MVC base track NAL unit is one embodiment for extracting varying levels of video quality from MVC base track 1705.

Furthermore, to maintain a constant level of quality, extractor track 1700 NAL units may extract different amounts of the base track NAL units. In an exemplary embodiment, extractor tracks compute the correct cut points to maintain a constant video quality. For example and by way of illustration, NAL units 1704A may instruct a decoder to extract more from NAL unit 1650A while NAL unit 1704B may instruct a smaller extraction from NAL unit 1650B to maintain an overall video viewpoint. Because extraction track 1700 reference NAL units 1650A-B, 1652A-B, extraction track 1700 represents the second viewpoint video stream. Thus, a video decoder can extract the second viewpoint video stream by reading extraction track 1700 without having to process the entire MVC base track 1705.

Similar to extraction track 1700, extraction track 1710 comprises NAL units 1714A-B. However, instead of NAL units 1714A-B referencing corresponding NAL units in MVC base track 1705, NAL units 1714A-B are copies of at least portions of NAL units 1650A-B. Thus, extraction track 1710 represents the first video viewpoint stream by containing the NAL units needed for this video stream. Furthermore, extractor tracks 200, 210 can be hinted just like other tracks in the video file. However, video track(s) comprising referencing extractor NAL units, should extract the bytes contained in the reference NAL units. For example and by way of illustration, video tracks that include referencing extractor NAL units 1704A-B, should extract the bytes from the referenced base NAL units 1650A-B.

Furthermore, in one embodiment, extraction tracks 1700 and 1710 can further comprise NAL units that are neither NAL reference units nor copies of NAL units from the base track. In this embodiment, these NAL units are partitions of a video base track different from MVC base track 1705. This embodiment can be used to combine extracted NAL units from MVC base track 1705 with different NAL units to form a second video stream. For example and by way of illustration, one extraction track combines extracted tracks from a two-dimensional MVC base track with additional NAL units to represent a three dimensional video stream. Thus, extraction tracks can be used to build a three-dimensional video stream from a two-dimensional video stream. In addition, another extract track combines extracted tracks from the two-dimensional MVC base track with additional NAL units to represent free viewpoint video stream. This example demonstrate using extractor track to build a multiview video stream from single view video stream. Thus, extractor tracks can be used to extract single view video streams from multiview video streams or build multiview video streams from single view video streams.

Figure 17B:
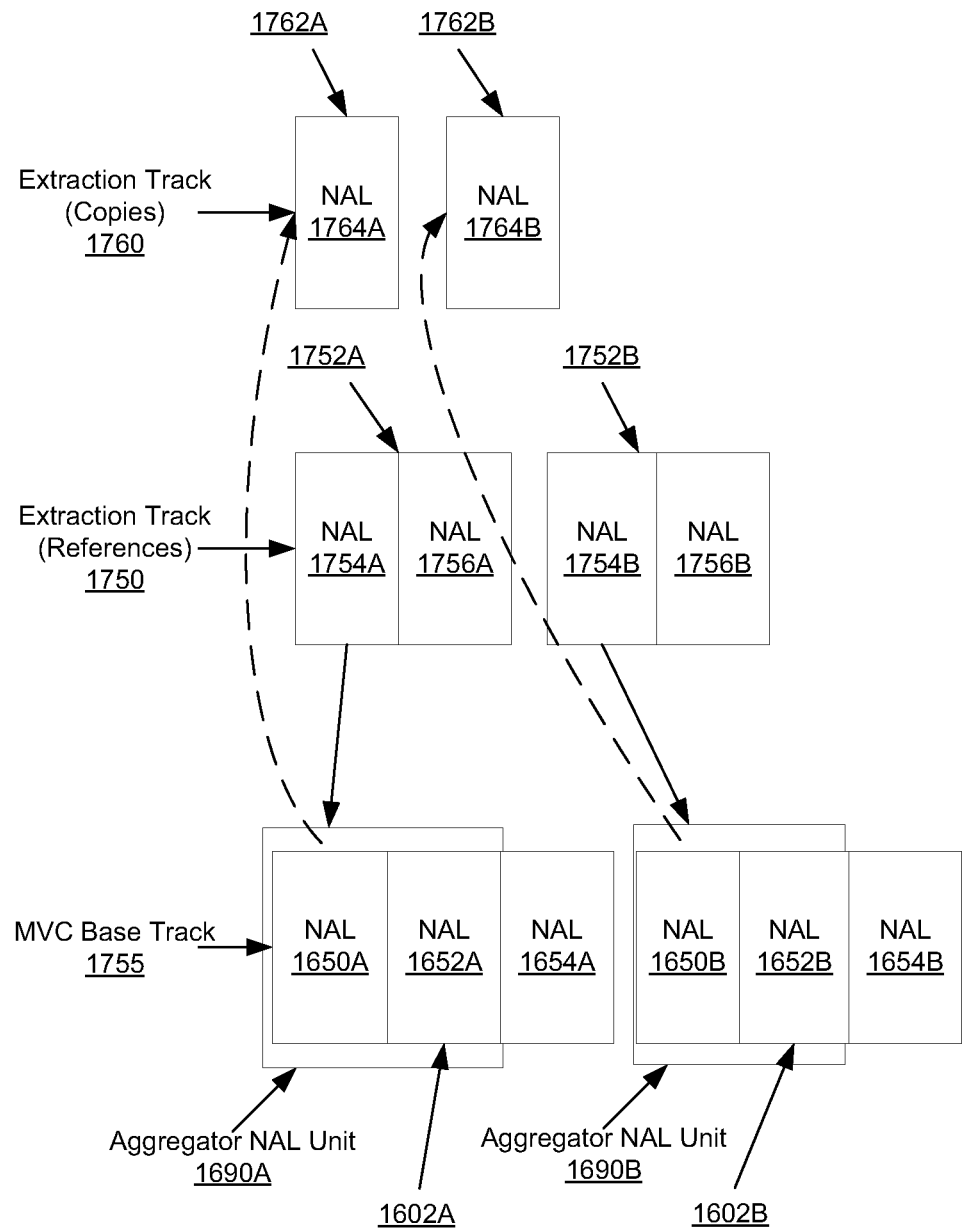
FIG. 17B is a block diagram illustrating one embodiment of extractor tracks used to extract video streams from an MVC coded base track comprising aggregator network abstraction layer units.

FIG. 17B is a block diagram illustrating one embodiment of extractor tracks used to extract video streams from an MVC coded base track comprising aggregator network abstraction layer units. Similar to FIG. 17A, MVC base tracks 1670 comprises video frames 1602A-B, with each video frame 1602A-B comprising NAL units 1650A-B, 1652A-B, 1654A-B that can be used for different video streams. MVC base tracks 1755 further comprises aggregator NAL units 1660A-B. Aggregator NAL unit groups NAL units 1650A, 1652A and aggregator NAL unit 1660B groups NAL units 1650 B, 1652B. Similar to FIG. 16A, a first resolution video stream is assembled from NAL units 1650A-B (e.g., two-dimensional video stream), a second resolution video stream is assembled from NAL units 1650A-B and 1652A-B (e.g., three-dimensional video stream), while a third video stream can be assembled from NAL units 1650A-B, 1652A-B, 1654A-B (e.g., free viewpoint video stream). As in FIG. 17A, extraction tracks 1700 and 1760 are used to extract different video streams available in MVC base track 1705. Extractor track 1700 is structured like an AVC and MVC base track because extractor track 1700 is a series of NAL units. Extractor track NAL units can be mixed in with other NAL units. Furthermore, extractor track 1700 has a track reference of 'mvc' that links extractor track 1700 to MVC base track 1705. In addition, extractor track has the same track type as MVC base track 1705. In addition, extractor tracks can reference to or copy from aggregator NAL units.

In one embodiment, extraction track 1750 references aggregator NAL units 1660A-B using NAL units 1754A-B, 1756A-B. By referencing aggregator NAL units 1660A-B, extraction track 1750 references all the NAL units that comprise the aggregator NAL unit. In another embodiment (not shown), a NAL unit that is part of extraction track 1750 may reference a particular NAL unit within the aggregating NAL unit. By referencing a particular unit, the referencing NAL unit references the particular NAL unit and not other NAL units that are part of the aggregator NAL unit. Similar to FIG. 17A, NAL units 1754A-B have similar properties to NAL units that reference a single NAL unit. For example and by way of illustration, extraction track 1750 comprises NAL units 1754A-B, 1756A-B which reference aggregator NAL units 1660A-B in MVC base track 1705. NAL units 1754A-B instruct the video decoder to find the temporally aligned NAL unit in MVC base track 1705 and extract all or part of that aggregated NAL unit. For example and by way of illustration, NAL unit 1754A instructs the decoder to find aggregator NAL unit 1660A and extract some or all NAL units the comprise aggregator NAL unit 1660A. If NAL unit 1754A instructs the decoder to extract part of aggregator NAL unit 1660A, NAL unit 1754A comprises instructions on the number of bytes to retrieve and an offset into aggregator NAL unit 1660A. Retrieving only part of MVC base track NAL unit is one embodiment for extracting varying levels of video quality from MVC base track 1705. Furthermore, to maintain a constant level of quality, extractor track 1750 NAL units may extract different amounts of the base track NAL units. In an exemplary embodiment, extractor tracks compute the correct cut points to maintain a constant video quality.

Similar to extraction track 1750, extraction track 1760 comprises NAL units 1764A-B. However, instead of NAL units 1764A-B referencing corresponding aggregator NAL units in MVC base track 1705, NAL units 1764A-B are copies of at least portions of NAL units 1650A-B. Furthermore, extractor tracks 1750, 1760 can be hinted just like other tracks in the video file.

Figure 18:
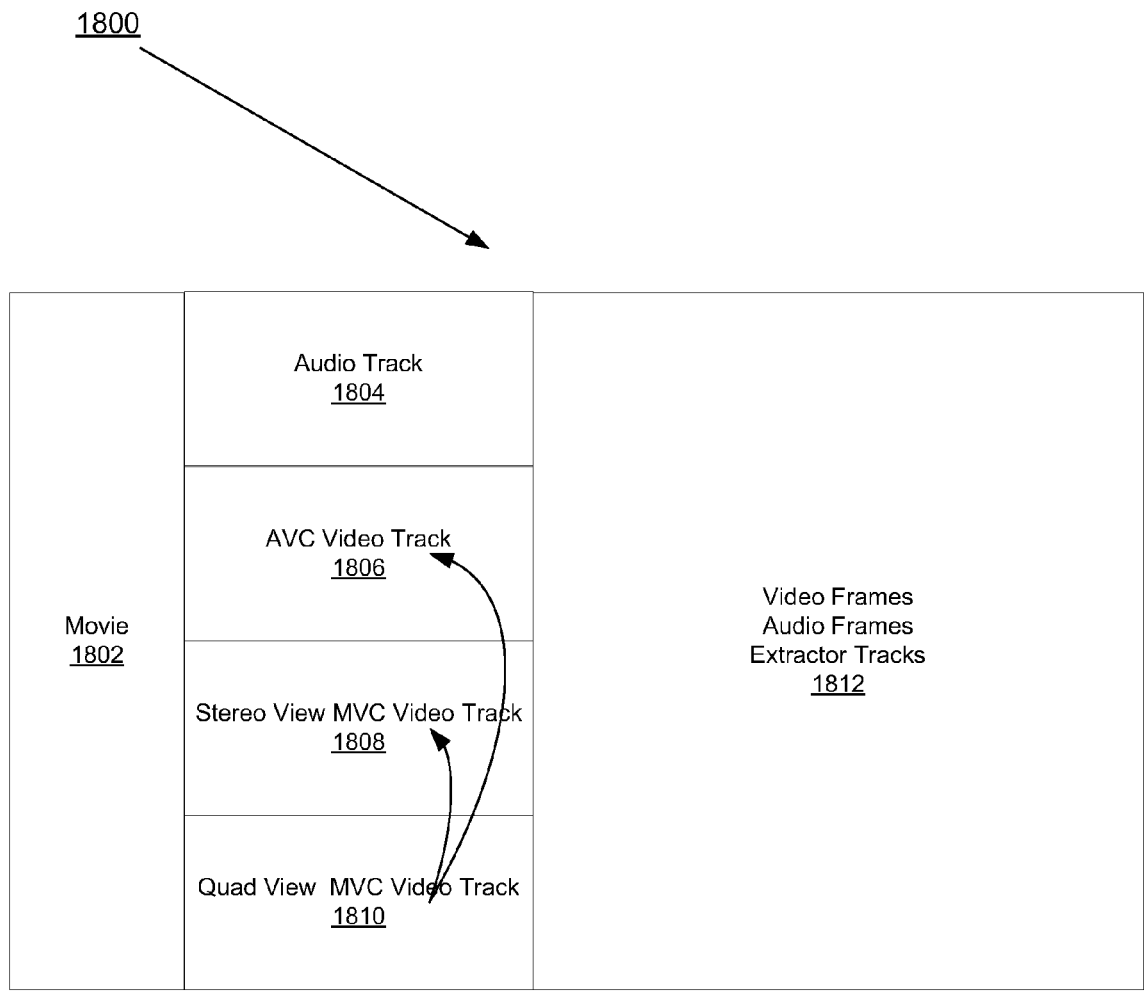
FIG. 18 is a block diagram illustrating one embodiment of a video file incorporating extractor tracks.

FIG. 18 is a block diagram illustrating one embodiment of a video file incorporating extractor tracks. In FIG. 18, video file 1800 comprises a movie header 1802, video metadata 1804-1810 and data 1812. The video metadata 1804-1810 comprises audio track 1804 and video tracks 1806-1810. Each of the tracks 1804-1810 describe which video/audio tracks are available in video file 1800. For example, three types of video are available in video file 1800: two-dimensional AVC video track 1806, three-dimensional MVC video track 1808, and free video viewpoint MVC video track 1810. A video decoder can query metadata 1804-1810 to determine what types of video/audio streams are available within video file 1800. Data 1812 comprises video frames (e.g., NAL units 1604A-D, etc., as illustrated in FIG. 16A), audio frames, and extractor tracks.

Figure 19:
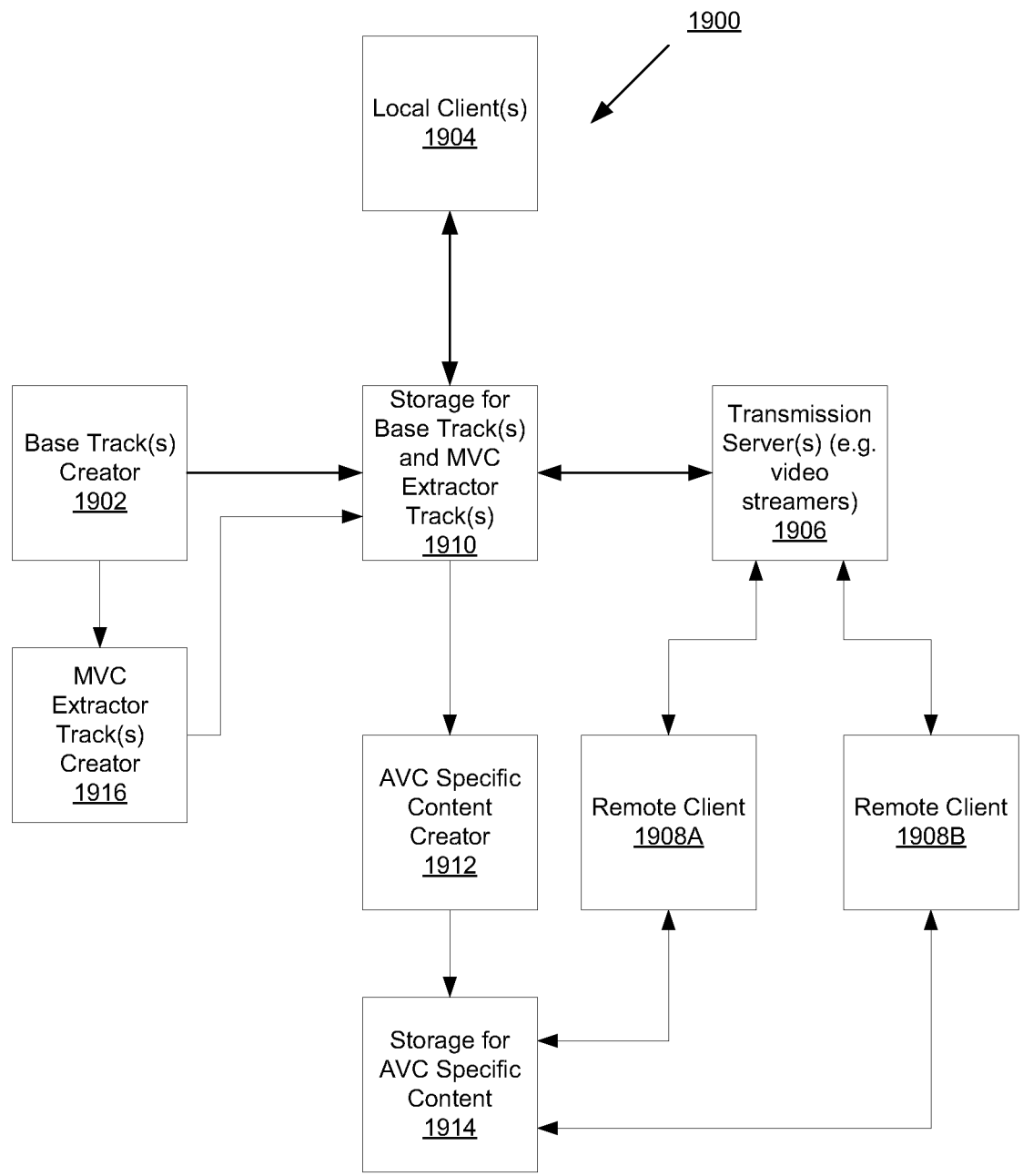
FIG. 19 is a block diagram illustrating one embodiment of a system that generates and uses extractor tracks with MVC base tracks.

FIG. 19 is a block diagram illustrating one embodiment of a system that generates and uses extractor tracks with MVC base tracks. In FIG. 19, base track(s) creator 1902 creates media containing MVC base tracks. The base tracks are stored in storage 1910. In addition, MVC extractor track(s) creator 1916 uses the base track(s) from base track(s) creator 1902 and creates extractor tracks for each operating point. The extractor track for each operating point is typically derived from its corresponding base track. An operating point is a unique combination of video for viewpoint and view. For example and by way of illustration, MVC extractor track(s) creator 1916 could create extractor tracks for video streams that is a two dimensional video stream; a three dimensional video stream; a free viewpoint video stream, etc. In general, MVC extractor track(s) creator 1916 can create extractor tracks for any video stream supported by the inputted MVC base track(s). Although in one embodiment the created MVC extractor tracks are stored in storage 1910, in alternate embodiments, the extractor tracks can be stored separately from the corresponding MVC base track. It will be appreciated that extractor tracks may exist only for a reasonable subset of operating points, rather than for all possible operating points, and users (e.g., client systems) select usable operating points from this subset. Alternatively, MVC Extractor Track(s) 1916 can form a single MVC track from two or more video streams while removing unnecessary or redundant parts of the video streams. For example and by way of illustration, MVC Extractor Track(s) 1916 could create an MVC media containing MVC base tracks from a two-dimensional video stream and a three-dimensional video stream.

MVC Extractor Track(s) 1916 processes the two video streams into a two-dimensional base track and an extractor track for the three-dimensional video stream.

The created MVC base and extractor tracks can be used in a variety of ways. In one embodiment, local client(s) 1904 read the MVC base and extractor track(s) from storage 1910 to determine which video streams are available in the MVC base and extractor track(s). Based on the video streams available, local client(s) extracts the desired video stream from the MVC base track(s) using the corresponding extractor track. While in one embodiment, a local client is a single instance of a program running on a machine local to storage 1910 that can read and process the base and extractor tracks, in alternate embodiments, local client(s) can be more than one instance of the same type of program. Processing of MVC base and extractor track(s) by local client(s) is further described in FIG. 21, below.

In an alternate embodiment, transmission server(s) 1906 processes MVC base and extractor track(s) for remote clients 1908A-B. In this client-server arrangement, remote clients 1908A-B transmit a request to transmission server(s) 1906 for video available from MVC base and extractor track(s). In one of the client-server embodiments, remote clients 1908A-B request the video by requesting the video stream directly from transmission server(s) 1906. In response, transmission server(s) 1906 accesses the corresponding extractor track(s), and uses the extractor track(s) to retrieve the requested video stream from the MVC base track(s). Transmission server(s) 1906 assembles the video stream and sends the video stream back to the requesting remote client. This client-server embodiment is further described in FIG. 22, below. In this approach, the transmission server(s) 1906 uses the extractor track to retrieve and transmit only the portions of the base track which are part of the operating point being used by the requesting remote clients 1908A-B, rather than analyzing the entire MVC base track(s).

In an alternate client-server embodiment, remote clients 1908A-B request possible video streams available from transmission server(s) 1906. In response, transmission server 1906 returns a list of available video stream(s) to the requesting remote client 1908A-B. While in one embodiment, transmission server(s) 1906 returns metadata 1804-1810 to remote clients 1908A-B, in alternate embodiments, transmission server(s) 1906 returns the list of available video streams in other means (e.g., simple list, common gateway interface (CGI) form comprising the list, etc.). Remote clients 1908A-B request the desired video stream to transmission server(s) 1906 and transmission server(s) sends the requested video stream. In an exemplary embodiment, remote clients 1908A-B request the extractor tracks corresponding to the desired video stream from transmission server(s) 1906. In response to receiving the extractor tracks, remote clients 1908A-B request the video stream by sending the appropriate commands to transmission server(s) 1906 (e.g., remote clients 1908A-B request video frames 1602A-B from MVC base track 1600 using HTTP byte-requests, etc.). This client-server embodiment is further described in FIG. 23, below.

In addition to being used by local 1904 and remote 1908A-B clients, MVC base and extractor track(s) may be processed by AVC specific content creator 1912. AVC specific content creator 1912 creates AVC specific content (e.g., H.264/AVC video content at a specific operating point) by accessing the MVC extractor track and using the extractor track to assemble the AVC specific content from the corresponding MVC base track(s). AVC specific content creator 1912 stores the AVC specific content in storage 1914. Remote clients 1908A-B can access the AVC specific content (e.g., H.264/AVC video content at a specific operating point) from storage 1914.

Figure 20:
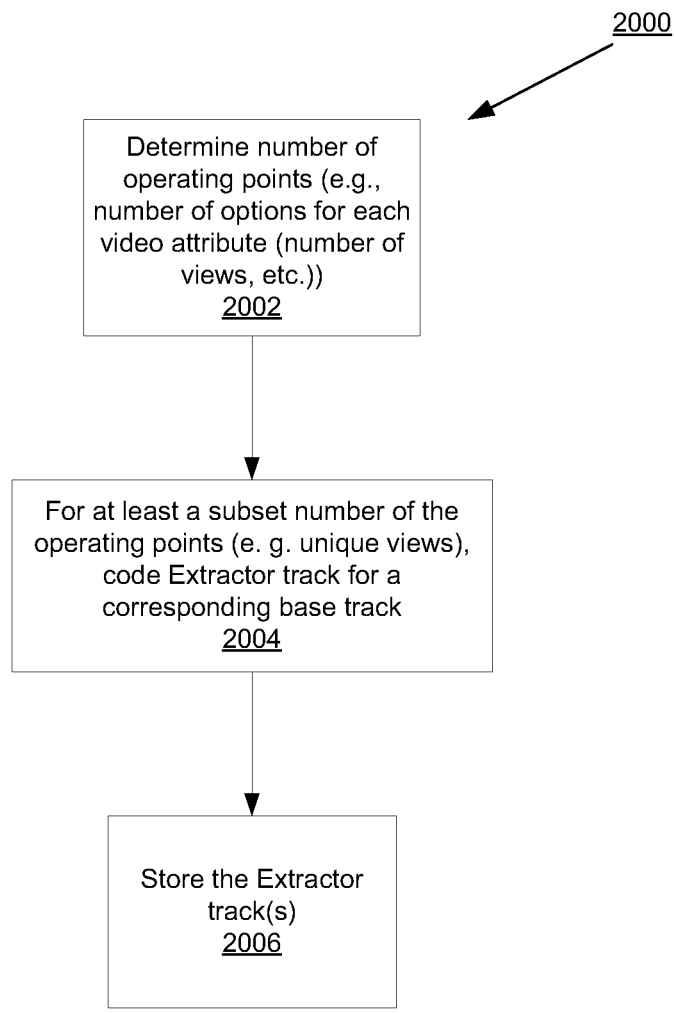
FIG. 20 is a flow chart of one embodiment of a method 2000 to generate MVC extractor track(s) from an MVC base track.

FIG. 20 is a flow chart of one embodiment of a method 2000 to generate MVC extractor track(s) from an MVC base track. At block 2002, method 2000 determines the number of operating points to be generated. As mentioned above, each operating point describes one video stream based on the video attributes associated with the operating point. While in one embodiment, each operating point is a unique combination of viewpoint and view, alternate embodiment can have operating points that include more, less and/or different video attributes (e.g., temporal, spatial, quality, bit-depth, chroma sub-sampling frequency, etc.). For example and by way of illustration, views describe the different views available (e.g., two dimensional, three dimensional, freepoint, etc.) and viewpoints are the individual video track that are used to make up one of the views (e.g., left, left', right, and right' viewpoints as illustrated in FIG. 16 above). As another example and by way of illustration, temporal video attributes describe the video stream frame rate (e.g., 8, 15, 30 fps, etc.), spatial video attributes describe the video stream resolution (e.g., SQCIF, QCIF, CIF, etc.), and quality video attributes describe the video stream quality, typically described in a signal-to-noise metric.

At block 2004, method 2000 codes the extractor tracks corresponding to the MVC base track for at least a subset of the operating points. Method 2000 creates one extractor track for operating points in the subset. As described above, the extractor tracks comprises NAL units that are either reference to NAL units in the MVC base track or are copies of NAL units in the base track. At block 2006, method 2000 stores the extractor track(s). In addition, method 2000 may optimize some of video file 300 containing the stored extractor tracks by re-laying out video file 300. This is particularly useful for extractor tracks that comprise copies of NAL units.

Figure 21:
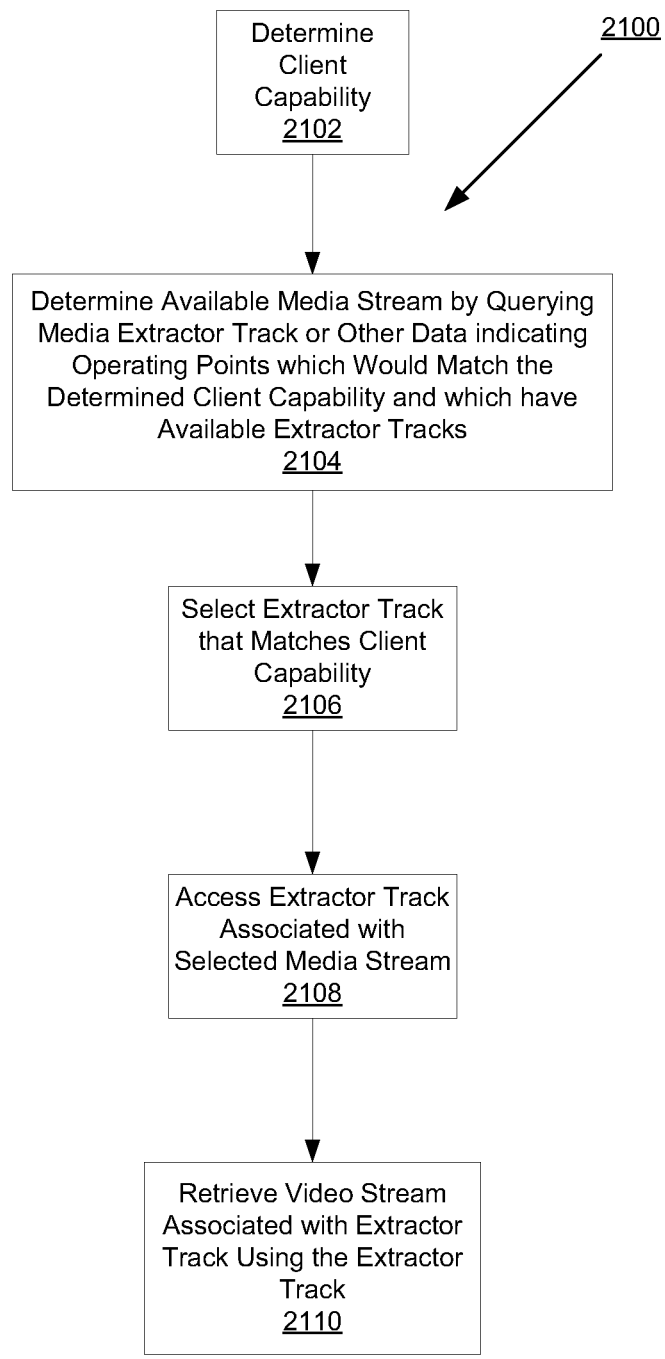
FIG. 21 is a flow chart of one embodiment of a method 2100 to retrieve a video stream from MVC base track using a corresponding extractor track.

FIG. 21 is a flow chart of one embodiment of a method 2100 to retrieve a video stream from MVC base track using a corresponding extractor track. At block 2102, method 2100 determines the client capability. Client capability is dependent on, but not limited to, display size, display graphics capability, memory, video buffer, processing power, etc. For example, and by way of illustration, a handheld device with a small display and low powered CPU may be able to process a two-dimensional video stream, whereas a desktop computer with a better CPU and graphics capability may be to handle a three-dimensional video stream.

At block 2104, method 2100 determines the available media streams by querying the media extractor track (or other data) that indicates which operating point matches the determined client capability and available extractor tracks. While in one embodiment, method 2100 queries the available media extractor tracks to determine a match, in alternate embodiments, method 2100 may determine the match with different means (e.g., query the media metadata 1804-1810, etc.). For example, and by way of illustration, if the target device is a handheld device, method 2100 determines if there available two dimensional media streams (e.g., base AVC track).

At block 2106, method 2100 selects the appropriate extractor track the matches the client capability. For example, and by way of illustration, if the client is a desktop computer with three dimensional video support, method 2100 would choose a three dimensional video stream over two dimensional video stream. At block 2108, method 2100 accesses the extractor tracks associated with the selected media stream.

At block 2110, method 2100 retrieves the video stream associated with the extractor track using the extractor track.

Method 2100 uses the extractor tracks to retrieve the video streams by (i) reading the data in the NAL unit, if the extractor track copied the video data from base track NAL unit into the extractor NAL unit; or (ii) using the extractor track NAL units as references to data for the video stream contained in the MVC base track. Either of these types of extractor tracks allows method 2100 to retrieve the video stream from an MVC coded base track. For example and by way of illustration, a referencing extractor track NAL units contains information for method 2100 to determine: (i) location of the appropriate NAL unit in the MVC base track, (ii) the offset from referenced NAL unit, and (iii) the number of bytes to copy from the referenced NAL unit.

Figure 22:
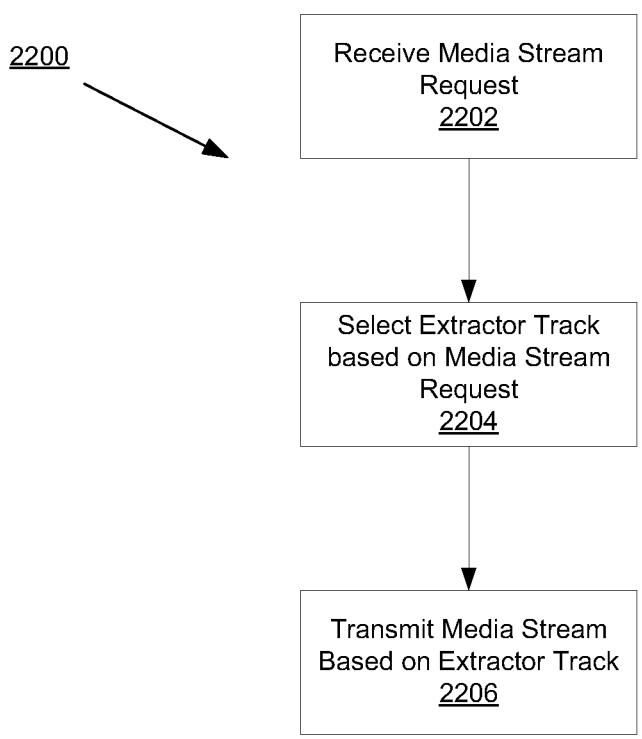
FIG. 22 is a flow chart of one embodiment of a method 2200 to retrieve a media stream from a MVC base by a transmission server for a remote client.

FIG. 22 is a flow chart of one embodiment of a method 2200 to retrieve a media stream from a MVC base by a transmission server for a remote client. At block 2202, method 2200 receives a media stream request. Although in one embodiment, the media stream request may be by the HTTP protocol, alternate embodiments may use different protocols known in the art (e.g., RTP, RTSP, etc.). At block 2204, method 2200 selects the extract track corresponding to the requested media stream. For example and by way if illustration, if the remote client requested a free viewpoint video stream, method 2200 selects the extractor tracks corresponding to that media stream.

At block 2206, method 2200 transmits media stream based on the selected extractor track. For example and by way of illustration, method 2200 assembles the media stream using the extractor as described at block 2110 and transmits the resulting video stream.

Figure 23:
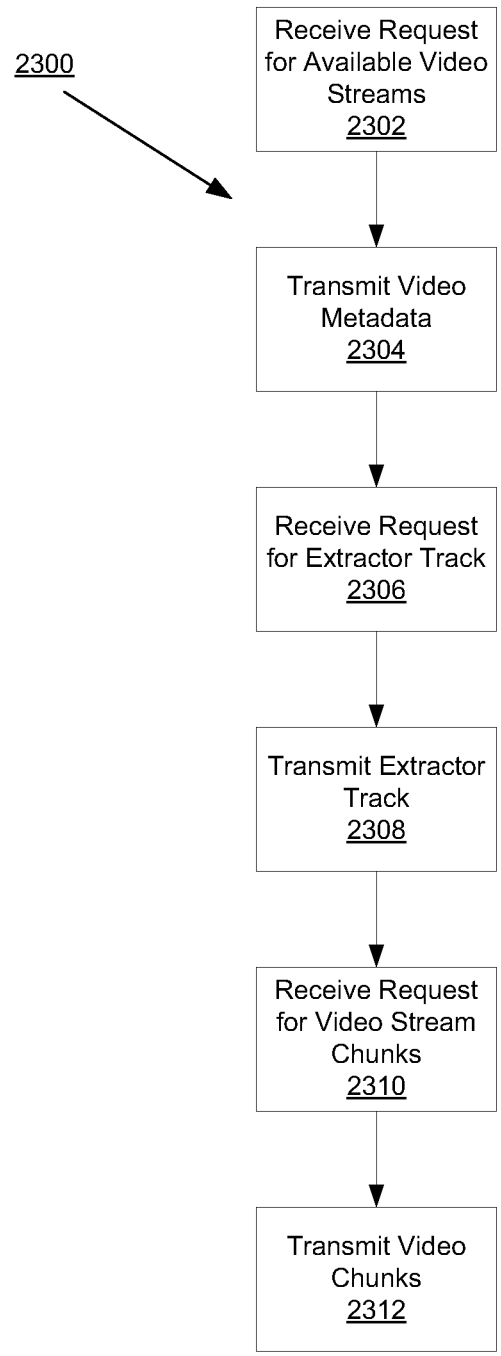
FIG. 23 is a flow chart of one embodiment of a method 2300 to retrieve a media stream from a MVC base track by a transmission server for a remote client with the remote client requesting the media stream using the extractor track.

FIG. 23 is a flow chart of one embodiment of a method 2300 to retrieve a media stream from a MVC base track by a transmission server for a remote client with the remote client requesting the media stream using the extractor track. Method 2300 differs from method 2200 in that the detailed information describing the video stream is handled by the remote client instead of the transmission server. In FIG. 23, the remote client extracts the video stream from the MVC base track using the extractor tracks. At block 2302, method 2300 receives a request for available video streams from the MVC base track. In response, method 2300 transmits the MVC base track video metadata at block 2304. While in one embodiment, method 2300 transmits the video metadata 1804-1810 as illustrated in FIG. 18, alternate embodiments may transmit other data that describes the available video streams coded within a MVC base track (e.g., send a simple list of video streams, etc.).

At block 2306, method 2300 receives a request for an extractor track. In response, method 2300 transmits the requested extractor track to the requesting remote client at block 2308. The remote client will use the extractor track to extract video frames (e.g., NAL units from the base track), if the extractor tracks contains referencing NAL units. Otherwise, if the extractor tracks contain copies of the NAL units, the remote client has the video stream and can process the video stream as needed.

At block 2310, method 2300 receives a video stream frame request based on the extractor track transmitted. In response, method 2300 transmits the requested video frames at block 2312.

Figure 24:
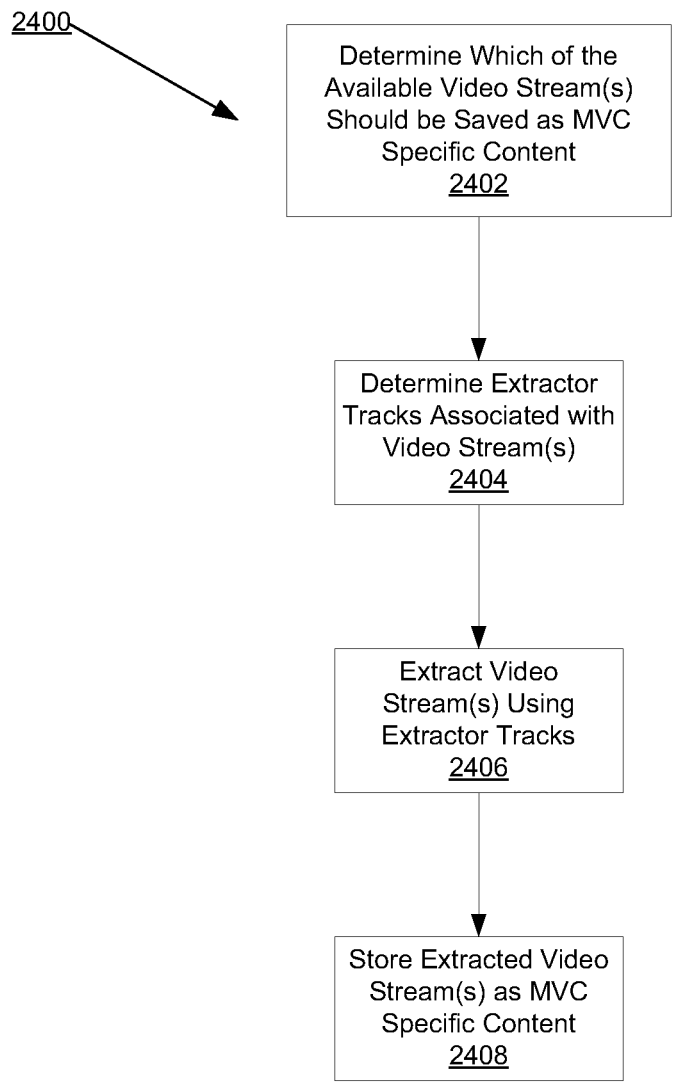
FIG. 24 is a flow chart of one embodiment of a method 2400 to save MVC specific content extracted from a MVC base track.

FIG. 24 is a flow chart of one embodiment of a method 2400 to save MVC specific content extracted from a MVC base track. MVC specific content differs from a MVC base track in that the MVC specific content contain one video stream whereas a MVC base track may contain multiple video streams. At block 2402, method 2400 determines which of the available video stream(s) should be saved as MVC specific content. Based on the video streams selected, method 2400 determines the extractor associated with the selected video stream(s). At block 2406, method 2400 extracts the video stream(s) using the associated extractor tracks. For example and by way of illustration, method 2400 extracts the video stream(s) as in block 2110. After extracting the video stream(s), method 2400 stores the video stream(s) as MVC specific content.

Figure 25:
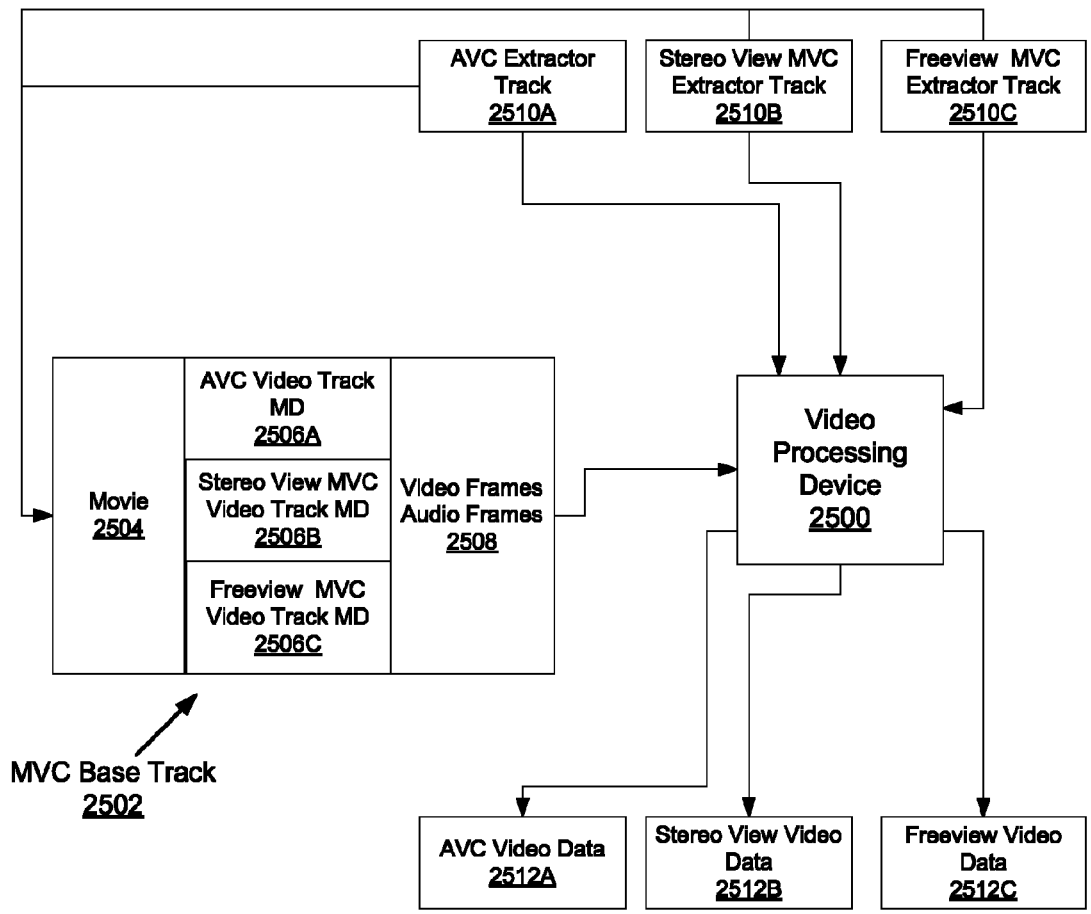
FIG. 25 is a block diagram of video processing device generating video from a MVC base track using extractor tracks.

FIG. 25 is a block diagram of video processing device 2500 that generates video from a MVC base track 2502 using extractor tracks 2510A-C. In FIG. 25, video processing device 2500 processes the video data of MVC base track 2502 using the extractor tracts 2510A-C to generate the video tracks 2512A-C for different views. In one embodiment, video processing device 2502 is a local client that processes the MVC base track 2502 with one or more of extractor tracks 2510A-C to generate and present the resulting video tracks 2512A-C, such as local client 1904 as described in FIG. 19 above. In another embodiment, video processing device 2502 is a transmission server that processes the MVC base track 2502 with one or more of extractor tracks 2510A-C to generate and transmits the resulting video 2512A-C to one of more remote clients. For example and in one embodiment, the transmission server is transmission server 1906 as described in FIG. 19 above.

In one embodiment, MVC base track comprises movie header 2504, video metadata 2506A-C, and audio/video data 2508. Each of the metadata 2504A-C describes which audio/video tracks are available in the MVC base track 2502. For example and in one embodiment, MVC base tracks have three types of video: two-dimensional AVC video track 2506A, three-dimensional MVC video track 2506B, and free video viewpoint MVC video track 2506C. The video processing device 2500 can query metadata 2506A-C to determine what types of video streams are available within the MVC base track 2502. Data 2508 comprises video frames (e.g., NAL units 1604A-D, etc., as illustrated in FIG. 16A) and audio frames. While in one embodiment, the extractor tracks 2510A-C are separate from the MVC base track 2502, in alternate embodiment, the extractor tracks are included in with the MVC base track 2502.

As described above, extractor tracks 2510A-C are used by video processing device 2500 to extract a video track from the MVC base track 2502 and generate that video track for presentation and/or transmission. For example and in one embodiment, video processing device 2500 uses AVC extractor track 2510A to extract AVC video data 2512A, stereo view MVC extractor track 2510B to extract stereo view video data 2512B, and free view MVC extractor track 2510C to extract free view video data 2512C. In one embodiment, the video processing device 2500 extracts the video tracks using an associated extractor tracks as described in FIG. 21, block 2110.

Provided below are some example formats of hints. It will be appreciated that the present invention, however, may be utilized with various types of network protocols, digital processing system architectures, media formats, etc., to provide transmission of time-based data.

Alternative Embodiments

While the invention has been described in terms of several embodiments and illustrative figures, those skilled in the art will recognize that the invention is not limited to the embodiments or figures described. In particular, the invention can be practiced in several alternative embodiments that provide packetization of time related media data.

Therefore, it should be understood that the method and apparatus of the invention can be practiced with modification and alteration within the spirit and scope of the appended claims. The description is thus to be regarded as illustrative instead of limiting on the invention.

APPENDIX A

Packetization Hint Sample Description

In one embodiment of the present invention, each hint track has a table of sample descriptions. Hint tracks typically have one sample description. The format for each sample description entry for a hint track, according to one embodiment of the present invention, is described below in Table 1.

TABLE 1

Hint Track Sample Description Format

| Hint Track Sample Description | Bytes |
|---|---|
| Sample description size | 4 |
| Data format | 4 |
| Reserved | 6 |
| Data reference index | 2 |
| Max packet size | 4 |
| Additional data table | variable |

The packetization hint header atom contains the following data elements:
Field Descriptions:

| | |
|---|---|
| Sample description size | A 32-bit integer that specifies the number of bytes in the sample description. |
| Data format | A 32-bit integer indicating the format of the hints stored in the sample data. Different formats may be defined for different hint types. The table below lists defined formats. |
| Reserved | Six bytes that are set to 0. |
| Data reference | A 16-bit integer that contains the index of the data index associated with the samples that use this sample description. Data references are stored in data reference atoms. |
| Max packet size | A 32-bit integer indicating the maximum size of packets computed in this track. |
| Additional Data Table | A table containing additional information needed on a per track basis. The values are tagged entries. There are no required entries. If an entry is not present in the table, a reasonable default may be used. |

The structure for the additional data table entries is shown in Table 2.

TABLE 2

Additional Data Table Format

| Additional Data Table | Bytes |
|---|---|
| Entry length | 4 |
| Data type | 4 |
| Data | Entry length - 8 |

The additional data table entries contain the following data elements:
Field Descriptions:

| | |
|---|---|
| Entry length | A 32-bit integer indicating the length of the entire entry (includes 8 bytes for the length and type fields) in bytes. |
| Data type | A 32-bit integer indicating the meaning of the data in the entry. |
| Data | The data for this entry. The length of the data is indicated by the Data length field of the table. |

The following data tags may defined for several various types of data format types. Other tags may be created as required.

| Length | Type | Data Description |
|---|---|---|
| 9 | 'rely' | A 1 byte integer indicating whether or not this track should be sent over a reliable transport. Values of 0 and 1 are defined. If this tag is not present, it is assumed to have the value zero, indicating that it can be sent over unreliable transports, such as UDP. |

The following data format types are defined. New types may be defined as needed.

| Data Format | Description |
|---|---|
| 'rtp' | The packetization hints for sending media over RTP for the specific media type and encoding as described by various IETF drafts of the Audio-Video Transport (AVT) working group. |

The following data tag is utilized in one embodiment for 'rtp' data.

| Length | Type | Data Description |
|---|---|---|
| 12 | 'tims' | A 32-bit number indicating the RTP timescale. This tag is present in one embodiment for RTP data. |

The following data tags are optional for 'rtp' data.

| Length | Type | Data Description |
|---|---|---|
| 12 | 'tsro' | A 32-bit number indicating the random offset to add to the stored time stamp when sending the RTP packets. If this field is not present, a truly random number should be used, as per the RTP specification. The value of this field could be zero, indicating that no random offset is to be added. |
| 10 | 'snro' | A 16-bit number indicating the random offset to add to the sequence number when sending the RTP packets. If this field is not present, a truly random number should be used, as per the RTP specification. The value of this field could be zero, indicating that no random offset is to be added. |

APPENDIX B

Example Hint Track for RTP

This section presents one example of a hint track format for streaming RTP from a QuickTime movie.

In standard RTP, each media stream is typically sent as a separate RTP stream. Multiplexing is generally achieved by using IP's port-level multiplexing, not by interleaving the data from multiple streams into a single RTP session. Therefore each media track in the movie should have an associated RTP hint track. In one embodiment of the present invention, each hint track contains a track reference back to the media track which it is streaming.

In this example, the packet size is determined at the time the hint track is created. Therefore, in the sample description for the hint track (a data structure which can contain fields specific to the 'coding'—which in this case is a protocol), the chosen packet size is indicated. In one example of the present invention, several RTP hint tracks are provided for each media track to provide different packet size choices. Other protocols may be parameterized as well. Similarly, the appropriate time-scale for the RTP clock is provided in the sample description below.

The hint track is related to its base media track by a single track reference declaration. (RTP does not permit multiplexing of media within a single RTP stream). The sample description for RTP declares the maximum packet size which this hint track will generate. Session description (SAP/SDP) information is stored in user-data atoms in the track.

Each sample in the RTP hint track contains the instructions to send out a set of packets which must be emitted at a given time. The time in the hint track is emission time, not necessarily the media time of the associated media.

In the following description the internal structure of samples, which are media data, not meta data, in the terminology of this example is described, need not be structured as objects.

In this example, each sample contains two areas: the instructions to compose the packets, and any extra data needed when sending those packets (e.g. an encrypted version of the media data).

```
struct  RTPsample {
        int(16)         packetcount;
        RTPpacket       packets[packetcount];
        byte[ ]         extradata;
}
```

Each RTP hint packet contains the information to send a single packet. In one embodiment, to separate media time from emission time, an RTP time stamp is specifically included, along with data needed to form the RTP header. In alternative embodiments, however, this is not the case. Other header information is typically supplied. A table of construction entries is constructed as follows:

```
struct  RTPpacket {
        int(32)         RTPtime;
        int(16)         partialRTPheader;
        int(16)         RTPsequenceseed;
        int(16)         entrycount;
        dataentry       constructors[entrycount];
}
```

There are various forms of the constructor. Each constructor is 16 bytes, which may make iteration relatively simple. The first byte is a union discriminator:

```
struct  dataentry {
        int(8) entrytype;
        switch entrytype {
                case immediate:
                        int(8)          bytecount;
                        int(8)          bytestocopy[bytecount];
                case mediasample:
                        int(8)          reserved[5];
                        int(16)         length;
                        int(32)         mediasamplenumber;
                        int(32)         mediasampleoffset;
                case hintsample:
                        int(8)          reserved[5];
                        int(16)         length;
                        int(32)         hintsamplenumber;
                        int(32)         hintsampleoffset;
        }
}
```

The immediate mode permits the insertion of payload-specific headers (e.g. the RTP H.261 header). For hint tracks where the media is sent 'in the clear', the mediasample entry may specify the bytes to copy from the media track, by giving the sample number, data offset, and length to copy. For relatively complex cases (e.g. encryption or forward error correction), the transformed data may be placed into the hint samples, and then hintsample mode may be used, which would be provided from the extradata field in the RTPsample itself.

In one example of the present invention, there is no requirement that successive packets transmit successive bytes from the media stream. For example, to conform with RTP-standard packing of H.261, in one example of the present invention, a byte may be sent at the end of one packet and also at the beginning of the next (when a macroblock boundary falls within a byte).

APPENDIX C

Packetization Hint Sample Data for Data Format 'rtp'

This appendix provides a description of the sample data for the 'rtp' format, according to one embodiment of the invention. The 'rtp' format assumes that a server is sending data using Real Time Transport Protocol (RTP). This format assumes that the server knows about RTP headers, but does not require that the server know anything about specific media header, including media headers defined in various IETF drafts.

In one embodiment of the present invention, each sample in the hint track will generate one or more RTP packets. Each entry in the sample data table in a hint track sample corresponds to a single RTP packet. Samples in the hint track may or may not correspond exactly to samples in the media track. In one embodiment of the present invention, data in the hint track sample is byte aligned, but not 32-bit aligned.

Field Descriptions:

| | |
|---|---|
| Entry count | A 16-bit unsigned integer indicating the number of packet entries in the table. Each entry in the table corresponds to a packet. Multiple entries in a single sample indicate that the media sample had to be split into multiple packets. A sample with an entry count of zero is reserved and if encountered, should be skipped. |
| Packet entry table | A variable length table containing packet entries. Packet entries are defined below. |

| Additional data | A variable length field containing data pointed to by the entries in the data table shown below by Table 3: |
|---|---|

TABLE 3

Additional Data

| Packet Entry | Bytes |
|---|---|
| Relative packet transmission time | 4 |
| Flags | 4 |
| RTP header info | 2 |
| RTP sequence number | 2 |
| Entry count | 2 |
| Data table | variable |

In one embodiment, the packet entry contains the following data elements:
Field Descriptions:

| relative packet transmission time | A 32-bit signed integer value, indicating the time, in hint track's timescale, to send this packet relative to the hint sample's actual time. Negative values mean that the packet will be sent earlier than real time, which is useful for smoothing the data rate. Positive values are useful for repeating packets at later times. Within each hint sample track, each packet time stamp is nondecreasing. |
|---|---|
| flags | A 32-bit field indicating certain attributes for this packet. |

The RTP header information field contains the following element:

| Field | Bit # | Description |
|---|---|---|
| R | 31 | A 1-bit number indicating that this is a repeat packet - the data has been defined in a previous packet. A server may choose to skip repeat packets to help it catch up when it is behind in its transmission of packets. All repeated packets for a given packet care in the same hint sample. All undefined bits (0-30) are reserved and are set to zero. |
| RTP header info | | A 16-bit integer specifying various values to be set in the RTP header. |

The RTP header information field contains the following elements:

| Field | Bit# | Description |
|---|---|---|
| P | 2 | A 1-bit number corresponding to the padding (P) bit in the RTP header. This bit may not be set, since a server that needed different packet padding may generally need to un-pad and re-pad the packet itself. |
| X | 3 | A 1-bit number corresponding to the extension (X) bit in the RTP header. This bit may not be set, since a server that needs to send its own RTP extension may either not be able to, or may be forced to replace any extensions from the hint track. |
| M | 8 | A 1-bit number corresponding to the marker (M) bit in the RTP header. |
| payload type | 9-15 | A 7-bit number corresponding to the payload type (PT) field of the RTP header. |

All undefined bits (0-1 and 4-7) are reserved and are set to zero. The location of the defined bits are in the same bit location as in the RTP header.

| RTP sequence number | A 16-bit integer specifying the RTP sequence number for the packet. The RTP server adds a random offset to this sequence number before transmitting the packet. This field allows re-transmission of packets, e.g., the same packet can be assembled with the same sequence number and a different (later) packet transmission time. For example, a text sample with a duration of 5 minutes can be retransmitted every 10 seconds so that clients that miss the original sample transmission (perhaps they started playing a movie in the middle) will be "refreshed" after a maximum of 10 seconds. |
|---|---|
| Entry count | A 16-bit unsigned integer specifying the number of entries in the data table. |
| Data table | A table that defines the data to be put in the payload portion of the RTP packet. This table defines various places the data can be retrieved, and is shown by Table 4. |

TABLE 4

Data Table

| Data table entry | Bytes |
|---|---|
| Data source | 1 |
| Data | 15 |

The data source field of the entry table indicates how the other 15 bytes of the entry are to be interpreted. Values of 0 through 4 are defined. The various data table formats are defined below. Although there are various schemes, the entries in the various schemes are typically 16 bytes long.

No-Op Data Mode

The data table entry has the following format for no-op mode:
Field Description:

| Data source = 0 | A value of zero indicates that this data table entry is to be ignored. |
|---|---|

Immediate Data Mode

The data table entry has the following format for immediate mode:
Field Description:

| Data source = 1 | A value of one indicates that the data is to be immediately taken from the bytes of data that follow. |
|---|---|
| Immediate length | An 8-bit integer indicating the number of bytes to take from the data that follows. Legal values range from 0 to 14. |
| Immediate data | 14 bytes of data to place into the payload portion of the packet. Only the first number of bytes indicated by the immediate length field are used. |

Sample Mode

The data table entry has the following format for sample mode:

Field Description:

| | |
|---|---|
| Data source = 2 | A value of two indicates that the data is to be taken from a track's sample data. |
| Track ref index | A value that indicates which track the sample data will come from. A value of zero means that there is exactly one media track referenced, which is to be used. Values from 1 to 127 are indices into the hint track reference atom entries, indicating from which original media track the sample is to be read. A value of −1 means the hint track itself, i.e., the sample from the same track as the hint sample currently being parsed is used. |
| Bytes per compression block | A 16-bit unsigned integer specifying the number of bytes that results from compressing the number of samples in the Samples per compression block field. A value of zero is equivalent to a value of 1. |
| Samples per compression block | A 16-bit unsigned integer specifying the uncompressed samples per compression block. A value of zero is equivalent to a value of 1. |
| Length | A 16-bit integer specifying the number of bytes in the sample to copy. |
| Sample Number | A 32-bit integer specifying sample number of the track. |
| Offset | A 32-bit integer specifying the offset from the start of the sample from which to start copying. If referencing samples in the hint track, this will generally point into the Additional Data area. |

If the bytes per compression block and/or the samples per compression block is greater than 1, than this ratio is used to translate a sample number into an actual byte offset. This ratio mode is typically used for compressed audio tracks in QuickTime movies, such that:

CB=NS*BPCB/SPCB wherein,
CB=compressed bytes
NS=number of samples
BPCB=bytes per compression block
SPCB=samples per compression block For example, a GSM compression block is typically 160 samples packed into 33 bytes. Therefore, BPCB=33 and SPCB=160. The hint sample requests 33 bytes of data starting at the 161st media sample. Assuming that the first QuickTime chunk contains at least 320 samples, so after determining that this data will come from chunk 1, and where chunk 1 starts, the ratio is utilized to adjust the offset into the file where the requested samples will be found:

```
chunk_number = 1; /* calculated by walking the sample-to-chunk atom*/
first_sample_in_this_chunk = 1; /* also calculated from that atom*/
chunk_offset = chunk_offsets[chunk_number]; /* from the stco atom */
data_offset = (sample_number − first_sample_in_this_chunk) * BPP /
SPP read_from_file(chunk_offset + data_offset, length); /* read our data */
```

Sample Description Mode

The data table entry has the following format for sample description mode:

Field Description:

| | |
|---|---|
| Data source = 3 | A value of three indicates that the data is to be taken from the media track's sample description table. |
| Track ref index | A value that indicates which track the sample data will come from. A value of zero means that there is exactly one hint track reference, which is to be used Values from 1 to 127 are indices into the hint track reference atom entries, indicating from which original media track the sample is to be read. A value of −1 means the hint track itself, i.e., the sample description from the same track as the hint sample currently being parsed is utilized. |
| Reserved | Four bytes that are set to zero. |
| Length | A 16-bit integer specifying the number of bytes in the sample to copy. |
| Sample description index | A 32-bit integer specifying the index into the media's sample description table. |
| Offset | A 32-bit integer specifying the offset from the start of the sample from which to start copying. |
| Additional data | A variable length field containing data pointed to by hint track sample mode entries in the data table. |

APPENDIX D

Example Hint Track Format for MPEG-2 Transport

This section presents one example of a simple track format for streaming MPEG-2 transport from a QuickTime movie holding elementary streams.

An MPEG-2 transport stream is associated with a multiplex of one or more elementary streams. For this reason, an MPEG-2 transport hint track describes how to construct such a multiplex from one or more media tracks. There is not necessarily a one to one relationship between media tracks and MPEG-2 transport hint tracks. Each hint track may contain references to the elementary streams it represents. In one example of the present invention, a QuickTime file might contain multiple such hint tracks to describe different multiplexes.

Packet size is generally not an issue, since all MPEG-2 transport packets are 188 bytes in size. In one example of the present invention, each transport packet (in the MPEG-2 transport protocol) contains payload data from one media track. This allows for a relatively simple hint description for each transport packet. In one example of the present invention, each such hint describes which header data appears on each transport packet, and then points to the payload in the appropriate media track for the transport packet. For packets which do not correspond with a media track, such as PSI packets, the hint may describe 188 bytes of header data, and any media track reference may be considered irrelevant. For packets which do correspond with a media track, the header data may account for information such as transport headers, possible adaptation headers, and PES headers for transport packets that begin PES packets.

Reference is made to the MPEG-2 transport hint track in the Sample Description Atom (of type 'stsd'). This atom includes a sample description table, and the entries in this table differ based on the media type. In one example of the present invention, hint tracks begin with the structure shown in Table 1. The additional data table may hold entries with the structure shown in Table 2:

In one example of the present invention, if the hint track is an MPEG-2 transport hint track, the data format in the hint track sample description entry will be 'm2t' and the max packet size will always be 188. In such a description entry, the types shown below in Tables 5-7 may be found in the additional data table:

TABLE 5

Additional Data Table Entries

| Entry length | Data type | Data description |
|---|---|---|
| 8 | 0x00000000 | Indicates there are no more entries in the table |
| 9 | 'otyp' | Describes how offsets are described in the hints. The one byte of data has values described below in FIG. B.4. This entry is mandatory in the additional data table. |
| 9 | 'msns' | Describes the size of media sample numbers. The one byte of data indicates how many bytes are used to specify media sample numbers. If this is not present, and media sample numbers are present in the sample data, the default value is 4 bytes. |
| 9 | 'msos' | Describes the size of media sample offsets. The one byte of data indicates how many bytes are used to specify media sample offsets. If this is not present, and media sample offsets are present in the sample data, the default value is 4 bytes. |
| 9 | 'fosz' | Describes the size of file offsets. The one byte of data indicates how many bytes are used to specify file offsets within samples If this is not present, and file offsets are present in the sample data, the default value is 4 bytes. |
| Variable | 'tmap' | Describes an abbreviated mapping of media tracks. Each 5 byte entry maps a 4 byte track ID to a 1 byte track reference number. This limits any given transport mux to containing no more than 256 media tracks, but this should not be a limiting factor, and this compression is useful in limiting the size of the hint track. The format of these 5 byte entries is specified below in FIG. B.5. This entry is mandatory in the additional data table. |

TABLE 6

'otyp' Values In the Additional Data Table

| Value | Description |
|---|---|
| 0 | Samples are described in terms of media samples |
| 1 | Samples are described in terms of file offsets |

TABLE 7

Format of Entries in the 'tmap' Additional Data Entry

| Length | Description |
|---|---|
| 4 | Original Track ID |
| 1 | Abbreviated track reference number used in samples |

In one example of the present invention, each hint sample describes one transport packet. Each transport packet can be described as some amount of header data, followed by some amount of payload from one media track. Since MPEG-2 transport packets are relatively small, a large number of hint samples may be generated, and thus, these samples preferably should be as small as possible. Several entries in the additional data table above may be used to minimize the size of samples, but such factors may make some of the fields in the sample entries variable in size.

If the 'otyp' entry in the data table has the value 0, indicating that payload data is described in terms of media samples, hint samples may be of the following form shown in Table 8:

TABLE 8

Hint Sample Format Using Media Sample References

| Length | Description |
|---|---|
| 1 | Track reference number of the media track holding the payload data for this packet. This can be mapped to a track ID using the 'tmap' entry in the additional data table. If the hint specifies 188 bytes of immediate data, this field is irrelevant. |
| 1 | The length of the immediate data for the packet. Note that this must be 188 or less, since transport packets are 188 bytes in length. |
| Variable | Bytes of immediate data to be used as the header for the transport packet. The number of bytes is described by the previous field. |
| Variable | The media sample number to use for the payload data. The default size of this field is 4 bytes, but may be modified by the presence of an 'msns' entry in the additional data table. |
| Variable | The media sample offset to use for the payload data. The default size of this field is 4 bytes, but may be modified by the presence of an 'msos' entry in the additional data table. |

In one example of the present invention, it is not necessary to indicate the length of the payload data for the packet since in MPEG-2, this length is equal to 188 minus the size of the header data for the packet.

If the 'otyp' entry in the data table has the value 1, indicating that payload data is described in terms of file offsets, hint samples may be of the following form shown in Table 9:

TABLE 9

| Length | Description |
|---|---|
| 1 | Track reference number of the media track holding the payload data for this packet. This can be mapped to a track ID using the 'tmap' entry in the additional data table. If the hint specifies 188 bytes of immediate data, this field is irrelevant. |
| 1 | The length of the immediate data for the packet. Note that this must be 188 or less since transport packets are 188 bytes in length. |
| Variable | Bytes of immediate data to be used as the header for the transport packet. The number of bytes is described by the previous field. |
| Variable | The file offset where the payload data is located. This offset is in the file where the data for the media track is located. The default size of this field is 4 bytes, but may be modified by the presence of an 'fosz' entry in the additional data table. |

In one example of the present invention, hint samples may describe their offsets in terms of media samples or in terms of file offsets. Each of these has advantages and disadvantages. If hint samples specify payload in terms of media samples, they may be more resilient to additional editing of the file containing the media track, but may require additional processing for delivery. If hint samples specify payload in terms of file offsets, the payload data can be accessed relatively quickly, but any editing of the file containing the media track may invalidate the hints.

APPENDIX D

An Example File

Provided below is a relatively short (six frame) sample file, with some of the relatively less important fields and objects left out (marked here by ellipsis " . . . "), and with some fictitious numbers to illustrate the overall structure of a file which is ready for streaming over RTP, according to one embodiment of the present invention. The media data has been left out; only the meta-data is shown.

```
moov -- the entire movie meta-data
  mvhd -- overall movie information
    ...
    TIME-SCALE          600
    DURATION            2792
    PREFERRED-RATE      1
    VOLUME              255
    MATRIX              [[1 0 0] [0 1 0] [0 0 1]]
    ...
    NEXT-TRACK-ID       5 -- tracks 1 to 4 are here
  trak -- this is the video track
    tkhd
      ...
      TRACK-ID          1
      DURATION          2792
      LAYER             0
      ...
      MATRIX            [[1 0 0] [0 1 0] [0 0 1]]
      WIDTH             176
      HEIGHT            144
    mdia
      mdhd
        ...
        TIME-SCALE      600
        DURATION        2722
      hdlr -- we use the basic video media handler
        ...
        TYPE            mhlr
        SUBTYPE         vide
        MANUFACT        appl
        ...
        NAME            Apple Video Media Handler
      minf
        vmhd
          ...
          hdlr -- basic 'alias' disk data handler gets the data
            ...
            TYPE        dhlr
            SUBTYPE     alis
            MANUFACT    appl
            ...
            NAME        Apple Alias Data Handler
          dinf
            dref
              ...
              ENTRY-COUNT     1
              REFS            [Pointer to this file]
          stbl -- the complete sample table
            stsd -- the sample description(s)
              ...
              ENTRY-COUNT     1
              DESCRIPTIONS    [video sample description]
            stts -- convert time to sample
              ...
              ENTRY-COUNT     6
              TIMETOSAMPLE    ((1 200) -- count, duration
                               (1 251)
                               (1 479)
                               (1 531)
                               (1 1022)
                               (1 239))
            stss -- 'sync' or key sample numbers
              ...
              ENTRY-COUNT     1
              SYNCSAMPLES     (1)
            stsc -- sample to chunk
              ...
              ENTRY-COUNT     1
              SAMPLETOCHUNK   ((1 1 1))
                -- 1st chunk, samples/chunk, desc. number
            stsz -- sample sizes
              ...
              DEFSAMPLESIZE   0 -- no default size, all different
              ENTRY-COUNT     6
              SAMPLESIZES     (664
                               616
                               1176
                               1304
                               2508
                               588)
            stco -- chunk offsets into file
              ...
              ENTRY-COUNT     6
              CHUNKOFFSETS    (4743
                               5407
                               8010
                               12592
                               17302
                               25268)
  trak -- this is the sound track
    tkhd
      ...
      TRACK-ID          2
      DURATION          2792
      ...
      VOLUME            1
      ...
    mdia
      mdhd
        ...
        TIME-SCALE      8000
        DURATION        37280
        LANGUAGE        US English
        ...
      hdlr -- handled by the basic sound handler
        ...
        TYPE            mhlr
        SUBTYPE         soun
        MANUFACT        appl
        ...
        NAME            Apple Sound Media Handler
      minf
        smhd
          ...
          BALANCE       0
          hdlr -- data fetched by usual disc data handler
            ...
            TYPE        dhlr
            SUBTYPE     alis
            MANUFACT    appl
            ...
            NAME        Apple Alias Data Handler
          dinf
            dref
              ...
              ENTRY-COUNT     1
              REFS            [Pointer to this file]
          stbl -- sample table for the sound
            stsd -- sample descriptions
              ...
              ENTRY-COUNT     1
              DESCRIPTIONS    [Sound sample description, incl GSM]
            stts -- time to sample table
              ... -- sound is measured by uncompressed samples
              ENTRY-COUNT     1
              TIMETOSAMPLE    ((37280 1))
            stsc
              ...
              ENTRY-COUNT     2
              SAMPLETOCHUNK   ((1 4000 1)
                               (10 1280 1))
                -- first chunk, samples/chunk, desc. number
            stsz
              ...
              DEFSAMPLESIZE   1 -- all samples same size
              ENTRY-COUNT     37280
            stco -- chunk offset table
              ...
              ENTRY-COUNT     10
              CHUNKOFFSETS    (3093
                               3918
                               6023
                               9186
                               10915
                               13896 ...)
  trak -- the RTP hints for the video track
    tkhd
```

-continued

```
    ...
    TRACK-ID            3
    DURATION            2792
    ...
  tref
    hint -- references the video track
        TRACKIDS            (1)
  mdia
    mdhd
        ...
        TIME-SCALE          600
        DURATION            2792
        ...
    hdlr -- is 'played' by the hint media handler
        ...
        TYPE                mhlr
        SUBTYPE             hint
        MANUFACT            appl
        ...
        NAME                hint media handler
    minf
      gmhd
        ...
      hdlr -- if played, the regular disc handler would fetch data
        ...
        TYPE                dhlr
        SUBTYPE             alis
        MANUFACT            appl
        ...
        NAME                Apple Alias Data Handler
      dinf
        dref
          ...
          ENTRY-COUNT       1
          REFS              [Pointer to this file]
      stbl -- samples describe packets
        stsd
          ...
          ENTRY-COUNT       1
          DESCRIPTIONS      [hint sample description]
        stts -- one packet per frame for video
          ...
          ENTRY-COUNT       6
          TIMETOSAMPLE      ((1 270)
                             (1 251)
                             (1 479)
                             (1 531)
                             (1 1022)
                             (1 239))
        stss -- key sample derive from video
          ...
          ENTRY-COUNT       1
          SYNCSAMPLES       (1)
        stsc -- sample to chunk table
          ...
          ENTRY-COUNT       1
          SAMPLETOCHUNK     ((1 1 1))
        stsz -- sample sizes (packet instructions)
          ...
          DEFSAMPLESIZE     0
          ENTRY-COUNT       6
          SAMPLESIZES       (52
                             52
                             52
                             52
                             102
                             52)
        stco -- chunk offsets
          ...
          ENTRY-COUNT       6
          CHUNKOFFSETS      (6848
                             6900
                             10011
                             14721
                             20635
                             25856)
    udta -- track is named for ease of idientification
      name
        NAME                Hinted Video Track
trak -- the RTP hints for the sound track
```

```
  tkhd
    ...
    TRACK-ID            4
    ...
  tref -- references the sound track
    hint
        TRACKIDS            (2)
  mdia
    mdhd
        ...
        TIME-SCALE          8000
        DURATION            37120
        ...
    hdlr
        ...
        TYPE                mhlr
        SUBTYPE             hint
        MANUFACT            appl
        ...
        NAME                hint media handler
    minf
      gmhd
        ...
      hdlr
        ...
        TYPE                dhlr
        SUBTYPE             alis
        MANUFACT            appl
        ...
        NAME                Apple Alias Data Handler
      dinf
        dref
          ...
          ENTRY-COUNT       1
          REFS              [Pointer to this file]
      stbl
        stsd
          ...
          ENTRY-COUNT       1
          DESCRIPTIONS      [hint sample description]
        stts -- time to sample
          ...
          ENTRY-COUNT       4
          TIMETOSAMPLE      ((1 960)
                             (7 4000)
                             (1 1120)
                             (1 7040))
        stsc
          ...
          ENTRY-COUNT       1
          SAMPLETOCHUNK     ((1 1 1))
        stsz
          ...
          DEFSAMPLESIZE     0
          ENTRY-COUNT       10
          SAMPLESIZES       (206
                             852
                             852
                             852
                             852
                             852 ...)
        stco
          ...
          ENTRY-COUNT       10
          CHUNKOFFSETS      (6952
                             7158
                             10063
                             11740
                             14773
                             16450 ...)
    udta
      NAME                  Hinted Sound Track
```

What is claimed is:

1. A method for processing readable content stored in a first set of data which contains samples for presenting a presentation that can be viewed from any one of a plurality of views of multiview content, the method comprising:

storing the first set of data in a base track; and deriving a plurality of extractor track sets, wherein,
    each of the plurality of extractor track sets corresponds to one of a plurality of views of the multiview content and the plurality of extractor track sets are stored separately from the multiview content, wherein the multiview content is stored in a file and
    one of the plurality of extractor track sets includes a second set of data derived from the first set of data, the second set of data containing references to the first set of data for use in identifying first operating point data, for a first operating point of a plurality of operating points within the multiview content, from the first set of data, wherein each of the plurality of operating points correspond to a different view from the plurality of views of a subject of the multiview content and at least one of the different views includes content from a plurality of viewpoints and the identification of the first operating point data is accomplished without examining each piece of data in the first set of data and without examining all of the plurality of extractor track sets.

2. A method as in claim 1, wherein the second set of data contains samples for the first operating point copied from the first set of data.

3. A method as in claim 1, wherein the second set of data contains samples for the first operating point other than references for use in selecting data from the first set of data or copied from the first set of data.

4. A method as in claim 1 further comprising:
storing the second set of data;
deriving a third set of data from the first set, the third set containing references to the first set of data for use in selecting data, for a second operating point within the multiview content, from the first set of data; and
storing the third set; and wherein each of the first set of data, the second set of data and the third set of data has an order, wherein the order for each of the first set of data, the second set of data and the third set of data is from a beginning sample to an ending sample and each sample has an associated time which specifies the order.

5. A method as in claim 4 wherein the plurality of views comprise a first samples and each of the samples of the first samples is a Network Abstraction Layer (NAL) unit and the second set of data comprises a plurality of second samples, each referring one of the first samples and each being a NAL unit and each specifying a number of bytes in the one of the first samples, and wherein the plurality of second samples is contiguously stored separately from the first samples, and wherein the presentation is one of a movie with sound, a silent movie, or an audio only presentation.

6. A method as in claim 1 wherein each of the plurality of views comprises at least one viewpoint of a same video subject matter.

7. A method as in claim 5 wherein a viewpoint is a point to collect video of the same video subject matter.

8. A method as in claim 5 wherein the NAL unit is an aggregator NAL unit.

9. A method as in claim 1 wherein a view in the plurality of views is selected from the group consisting of two-dimensional video, three-dimensional video, quadview video, and freeview video.

10. A machine-readable media having executable instructions to cause a processor to perform a method for processing readable content stored in a first set of data which contains samples for presenting a presentation that can be viewed from any one of a plurality of views of multiview content, the method comprising:
storing the first set in a base track of data; and
deriving a plurality of extractor track sets, wherein,
    each of the plurality of extractor track sets corresponds to one of a plurality of views of the multiview content and the plurality of extractor track sets are stored separately from the multiview content, wherein the multiview content is stored in a file and
    one of the plurality of extractor track sets includes a second set of data derived from the first set of data, the second set of data containing references to the first set of data for use in identifying first operating point data, for a first operating point of a plurality of operating points within the multiview content, from the first set of data, wherein each of the plurality of operating points correspond to a different view from the plurality of views of a subject of the multiview content and at least one of the different views includes content from a plurality of viewpoints and the identification of the first operating point data is accomplished without examining each piece of data in the first set of data and without examining all of the plurality of extractor track sets.

11. A machine-readable media as in claim 10, wherein the second set of data contains samples for the first operating point copied from the first set of data.

12. A machine-readable media as in claim 10, wherein the second set of data contains samples for the first operating point other than references for use in selecting data from the first set of data or copied from the first set of data.

13. A machine-readable media as in claim 10 further comprising:
storing the second set of data;
deriving a third set of data from the first set of data, the third set of data containing references to the first set of data for use in selecting data, for a second operating point within the multiview content, from the first set of data; and
storing the third set of data; and wherein each of the first set of data, the second set of data and the third set of data has an order, wherein the order for each of the first set of data, the second set of data and the third set of data is from a beginning sample to an ending sample and each sample has an associated time which specifies the order.

14. A machine-readable media as in claim 13 wherein the plurality of views comprise a first samples and each of the samples of the first samples is a Network Abstraction Layer (NAL) unit and the second set of data comprises a plurality of second samples, each referring one of the first samples and each being a NAL unit and each specifying a number of bytes in the one of the first samples, and wherein the plurality of second samples is contiguously stored separately from the first samples, and wherein the presentation is one of a movie with sound, a silent movie, or an audio only presentation.

15. A machine-readable media as in claim 10 wherein each of the plurality of views comprises at least one viewpoint of a same video subject matter and a viewpoint is a point to collect video of the same video subject matter.

16. A machine-readable media as in claim 10 wherein a view in the plurality of views is selected from the group consisting of two-dimensional video, three-dimensional video, quadview video, and freeview video.

17. An apparatus for processing readable content stored in a first set of data which contains samples for presenting a presentation that can be viewed from any one of a plurality of views of multiview content, the method comprising:
means for storing the first set of data in a base track; and
means for deriving a plurality of extractor track sets, wherein, each of the plurality of extractor track sets corresponds to one of a plurality of views of the multiview content and the plurality of extractor track sets are stored separately from the multiview content, wherein the multiview content is stored in a file, and one of the plurality of extractor track sets includes a second set of data derived from the first set of data, the second set of data containing references to the first set of data for use in identifying first operating point data, for a first operating point of a plurality of operating points within the multiview content, from the first set of data, wherein each of the plurality of operating points correspond to a different view from the plurality of views of a subject of the multiview content and at least one of the different views includes content from a plurality of viewpoints and the identification of the first operating point data is accomplished without examining each piece of data in the first set of data and without examining all of the plurality of extractor track sets.

18. An apparatus as in claim 17 further comprising:

means for receiving the second set of data;

means for deriving a third set of data from the first set of data, the third set of data containing references to the first set of data for use in selecting data, for a second operating point within the multiview content, from the first set of data; and means for storing the third set of data; and wherein each of the first set of data, the second set of data and the third set of data has an order, wherein the order for each of the first set of data, the second set of data and the third set of data is from a beginning sample to an ending sample and each sample has an associated time which specifies the order.

19. An apparatus as in claim 17 wherein the plurality of views comprise first samples and each of the samples of the first samples is a Network Abstraction Layer (NAL) unit and the second set of data comprises a plurality of second samples, each referring one of the first samples and each being a NAL unit and each specifying a number of bytes in the one of the first samples, and wherein the plurality of second samples are contiguously stored separately from the first samples, and wherein the presentation is one of a movie with sound, a silent movie, or an audio only presentation.

20. A system for processing multiview content stored in a first set of data which contains samples for presenting a presentation that can be viewed from any one of a plurality of scales of multiview content, the system comprising:

a processor; and a memory coupled to the processor though a bus, wherein the processor is programmed to cause the processor to store the first set of data in a base track and derive a plurality of extractor track sets, wherein, each of the plurality of extractor track sets corresponds to one of a plurality of views of the multiview content and the plurality of extractor track sets are stored separately from the multiview content, wherein the multiview content is stored in a file, and one of the plurality of extractor track sets includes a second set of data derived from the first set of data, the second set of data containing references to the first set of data for use in identifying first operating point data, for a first operating point of a plurality of operating points within the multiview content, from the first set of data, wherein each of the plurality of operating points correspond to a different view from the plurality of views of a subject of the multiview content and at least one of the different views includes content from a plurality of viewpoints and the identification of the first operating point data is accomplished without examining each piece of data in the first set of data and without examining all of the plurality of extractor track sets.

* * * * *